US006081317A

United States Patent [19]

Nomura et al.

[11] Patent Number: 6,081,317

[45] Date of Patent: Jun. 27, 2000

[54] IMAGE REPRODUCING METHOD

[75] Inventors: Shouichi Nomura; Tsuyoshi Haraguchi; Yoshiaki Yamanaka, all of Hino, Japan

[73] Assignee: Konica Corporation, Tokyo, Japan

[21] Appl. No.: 09/106,106

[22] Filed: Jun. 29, 1998

[30] Foreign Application Priority Data

Jun. 30, 1997 [JP] Japan .................................... 9-173857

[51] Int. Cl.[7] ............................ G03B 27/52; G03B 27/32

[52] U.S. Cl. ................................................ 355/40; 355/27

[58] Field of Search ................................ 355/27–29, 40, 355/41, 42, 43; 358/518, 521, 350

[56] References Cited

U.S. PATENT DOCUMENTS

| | | | |
|---|---|---|---|
| 5,410,418 | 4/1995 | Yonezawa | 358/456 |
| 5,712,930 | 1/1998 | Watanabe | 382/270 |
| 5,790,240 | 8/1998 | Ishikawa et al. | 355/68 |
| 5,790,280 | 8/1998 | Terashita | 358/501 |
| 5,844,699 | 12/1998 | Usami et al. | 358/518 |

FOREIGN PATENT DOCUMENTS

| | | |
|---|---|---|
| 0 255 127 | 2/1988 | European Pat. Off. . |
| 0 356 328 | 2/1990 | European Pat. Off. . |
| 0 428 790 | 5/1991 | European Pat. Off. . |
| 0 701 362 | 3/1996 | European Pat. Off. . |
| 0 773 470 | 5/1997 | European Pat. Off. . |

OTHER PUBLICATIONS

European Search Report, Nov. 5, 1998.

*Primary Examiner*—Alan A. Mathews
*Assistant Examiner*—Hung Henry Nguyen
*Attorney, Agent, or Firm*—Finnegan, Henderson, Farabow, Garrett & Dunner, L.L.P

[57] ABSTRACT

An image reproducing method includes a step of obtaining a print reproducing an object based on image information obtained by photographing the object, wherein logarithm E of object brightness satisfies formula (1) and formula (2) is effected with the logarithm E, $$D(E1) \leq D(E) \leq D(E2) \quad (1)$$

$$0.7 \leq (D(E+0.1)-D(E))/0.1 \leq 1.3 \quad (2)$$

wherein D(E) represents density on the print reproduced by the logarithm E of object brightness, Dmin represents minimum density reproduced on the print, and D(E1) and D(E2) satisfy the following formulas.

$$D(E1)=Dmin+0.15$$

$$D(E2)=Dmin+0.4$$

22 Claims, 8 Drawing Sheets

IMAGE REPRODUCING METHOD

BACKGROUND OF THE INVENTION

The present invention relates to an image reproducing method to reproduce an image of an object on a print, an image reproducing system and an image processing apparatus.

As a theoretical reproduction of gradation, it has been known to determine density of a reproduced image so that the sum of a logarithm of object brightness and density of the reproduced image may be constant. This method, however, has been considered to have a problem that gradation of an image of an object with high luminance can not be reproduced, because density on a print can not be zero or less, Therefore, it has generally been conducted in the photographic industry that gradation of an object image on the part of high luminance is barely reproduced by reproducing a low density area of a reproduced image on a print (an area of the density covering from the lowest density to the density representing the lowest density plus 0.5) to be soft in terms of gradation.

In the case of a color print, in particular, colors and signals of an image pickup medium for each primary color have color cross-over, and color dyes forming a color print are not pure primary colors. For making color reproduction in the vicinity of luminance of a primary object to be excellent, therefore, it has generally been conducted in the photographic industry that a density area excluding a low density area of the reproduced image on a print is reproduced to be high in terms of contrast.

Further, since a range of colors reproducible on a print is considerably smaller than that of actual object brightness, it is conducted in the electrical machinery industry that colors are compressed with various color coordinate systems such as CIELUV and CIELAB to be reproduced.

In the method generally used in the photographic industry, however, even when a primary object such as a person is photographed with frontal lighting under a blue sky, for example, the sky is reproduced to be light gray on a color print, making the color print look as if it was photographed under a clouded sky, because an image of an object on the part of high luminance is reproduced to be soft in terms of gradation.

With regard to a face of a person representing an important object, when the face is of a bright flesh color, it is preferable that the face is reproduced to be bright on a print. In the method used generally in the photographic industry, however, sufficient gradation feeling can not be obtained, resulting in an image lacking three-dimensional feeling, because an image of an object reproduced on the part of low density on a print, mamely, an image of an object on the part of high luminance is reproduced to be soft in terms of gradation. In addition, in the same way as in the foregoing, when an image of an object with bright color is reproduced to be bright, sufficient gradation feeling can not be obtained, resulting in an image lacking three-dimensional feeling.

Further, when a density area excluding a low density area of a reproduced image on a print is made to be high in terms of contrast, a density area where gradation can be reproduced sufficiently is narrowed, which is a problem. In the case of a color print, there sometimes occurs undesirable color reproduction such as an occasion where a color of a face with a bright flesh color tends to be reproduced to be more yellowish than its actual color.

A method to reproduce through color compression conducted with various color coordinate systems such as CIELUV and CIELAB requires complicated operations to convert color image information into color coordinates systems in an even color space such as CIELUV and CIELAB, further, to conduct color compression processing with the color coordinates systems in an even color space, and thereby to convert from the color coordinates systems in an even color space to information of color images in blue, green, red or yellow, magenta and cyan (, black), and yet the reproduction made by the method is still inferior to that made by a conventional method in the photographic industry.

SUMMARY OF THE INVENTION

An object of the invention is to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky.

Problems awaiting solution in the invention are solved by the following items.

Item 1

An image reproducing method to obtain a print reproducing the object based on image information obtained by photographing the object, wherein following expression (2) holds for logarithm E of arbitrary object brightness which satisfies following expression (1).

$$D(E1) \leqq D(E) \leqq D(E2) \quad \text{Expression (1)}$$

$$0.7 \leqq ((D(E+0.1)-D(E)))/0.1 \leqq 1.3 \quad \text{Expression (2)}$$

In the above expressions, D(E) represents density with which an object with luminance logarithm E is reproduced on a print, and Dmin represents minimum density reproduced on a print, satisfying the following.

$$D(E1)=Dmin+0.15$$

$$D(E2)=Dmin+0.4$$

Due to the invention described in Item 1, it is possible to obtain a print which offers sufficient gradation feeling and three-dimensional feeling, even when a bright color object with a face having a bright flesh color is reproduced to be bright.

In particular, the image information stated above is color image information in Item 1, the print mentioned above is a color print, and the expression (2) holds for logarithm E of arbitrary object brightness satisfying the expression (1) for each primary color of the color print. Therefore, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a print on which color reproduction on the part of low luminance is excellent.

Item 2

The image reproducing method according to Item 1 wherein following expression (4) holds for logarithm E of arbitrary object brightness which satisfies following expression (3).

$$D(E2) \leqq D(E) \leqq D(E3) \qquad \text{Expression (3)}$$

$$1.0 \times A1 \leqq ((D(E+0.1)-D(E)))/0.1 \leqq 1.2 \leqq A1 \qquad \text{Expression (4)}$$

provided that, $$A1 = |(D(E2)-D(E1))/(E2-E1)|$$

$$D(E3) = Dmin+1.0$$

Due to the invention described in Item 2, it is possible to secure a broad area for gradation reproduction while keeping excellent gradation feeling and sufficient three-dimensional feeling, and thereby to reproduce with excellent gradation feeling and sufficient three-dimensional feeling, covering from an object with a bright color to that with a dark color.

In particular, due to the image reproducing system described in Embodiment Item 1 wherein the image information in Embodiment Item 2 is color image information, the print mentioned above is a color print, and the expression (4) holds for logarithm E of arbitrary object brightness satisfying the expression (3) for each primary color of the color print. It is possible to prevent occurrence of unnatural color reproduction for specific colors in a medium density area such as that a color of a face with a bright flesh color is reproduced to be more yellowish than its actual color, and thereby to obtain an excellent print on which natural colors are reproduced in the medium density area.

Item 3

The image reproducing method according to Item 1 or Item 2 wherein following expression (6) holds for logarithm E of arbitrary object brightness which satisfies following expression (5).

$$D(E3) \leqq D(E) \leqq D(E4) \qquad \text{Expression (5)}$$

$$1.0 \times A2(D(E+0.1) \leqq D(E)))0.1 \leqq 2.0 \times A2 \qquad \text{Expression (6)}$$

provided that, $$A2 = |(D(E3)-D(E2))/(E3-E2)|$$

$$D(E3) = Dmin+1.0$$

$$D(E4) = Dmin+1.5$$

The invention described in Item 3 makes dark colors on the print to be tight because a high density area is reproduced to be high in terms of contrast.

Since following expression (7) holds for logarithm E of arbitrary object brightness which satisfies the expression (5), there is offered an effect to improve tightness and minimum density of an image visually, because a high density area is reproduced to be higher than a medium density area in terms of contrast.

$$1.1 \times A2 \leqq (D(E+0.1)-D(E)))/0.1 \qquad \text{Expression (7)}$$

In color image information in general, colors and signals for each primary color have color cross-over on an image pickup medium, and color dyes forming a color print are not pure primary colors. In particular, the image reproducing system described in Embodiment Item 1 wherein the image information in Embodiment Item 3 is color image information, the print mentioned above is a color print, and the expression (6) holds for logarithm E of arbitrary object brightness satisfying the expression (5) for each primary color of the color print can reproduce a high chroma object (whose luminance of one or two primary colors out of blue, green and red primary colors is considerably low, namely reproduced in a high density area on a print) on a print to be in excellent color.

Item 4

An image reproducing system having therein a reading means which reads from an image recording medium an image obtained through photographing of an object, and thereby obtains read image information, an image processing means which converts the read image information into output image information, and an image outputting means which outputs a print reproducing the object based on the output image information, wherein the image processing means has conversion mode $\alpha$ which converts the read image information into the output image information in a manner that following expression (2) holds for logarithm E of arbitrary object brightness which satisfies the expression (1).

$$D(E1) \leqq D(E) \leqq D(E2) \qquad \text{Expression (1)}$$

$$0.7 \leqq ((D(E+0.1)-D(E)))/0.1 \leqq 1.3 \qquad \text{Expression (2)}$$

provided that,

D(E) represents density with which an object with luminance logarithm E is reproduced on a print, and Dmin represents minimum density reproducible on a print, and $$D(E1) = Dmin+0.15$$

$$D(E2) = Dmin+0.4$$

In the invention described in Item 4 wherein the conversion mode $\alpha$ converts the read image information into the output image information, it is possible to obtain a print which offers sufficient gradation feeling and three-dimensional feeling, even when an object with a bright color such as a face of a person with a bright flesh color is reproduced to be bright.

In an image reproducing system having therein a reading means which reads from an image recording medium a color image obtained through photographing of an object and obtains color read image information, an image processing means which converts the color read image information into color output image information, and an image output means which outputs a color print that reproduces the object based on the color output image information, wherein the image processing means has conversion mode $\xi$ which converts the color read image information into the color output image information for each primary color of the color print so that the aforesaid expression (2) may hold for logarithm E of arbitrary object brightness that satisfies the expression (1) in Embodiment Item 4, in particular, when the color read image information is converted into the color output image information by the conversion mode $\xi$, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a print on which the color reproduction on the part of low luminance is excellent.

Item 5

The image reproducing system described in Item 4 wherein at least one of the conversion mode α of the image processing means is conversion mode β which converts the read image information into the output image information so that following expression (4) may hold for logarithm E of arbitrary object brightness that satisfies following expression (3).

$$D(E2) \leqq D(E) \leqq D(E3) \qquad \text{Expression (3)}$$

$$1.0 \times A1 \leqq ((D(E+0.1)-D(E)))/0.1 \leqq 1.2 \times A1 \qquad \text{Expression (4)}$$

provided that, $$A1=|(D(E2)-D(E1))/(E2-E1)|$$

$$D(E3)=Dmin+1.0$$

In the invention described in Item 5, when the read image information is converted into the output image information by conversion mode β, the gradient of gradation reproduced on the density area where the density is higher by 0.4–1.0 than minimum density reproduced on a print is 1.0×A1–1.2×A1, which is ideal reproduction. Therefore, it is possible to secure a broad area for gradation reproduction while keeping excellent gradation feeling and sufficient three-dimensional feeling, and thereby to reproduce with excellent gradation feeling and sufficient three-dimensional feeling, covering from an object with a bright color to that with a dark color.

In the image reproducing system described in Item 4 wherein at least one of the conversion mode ξ of the image processing means is conversion mode η which converts, for each primary color of the color print, the color read image information into the color output image information so that following expression (4) may hold for logarithm E of arbitrary object brightness that satisfies following expression (3) in Embodiment Item 5, in particular, when the color read image information is converted into the color output image information by the conversion mode η, it is possible to prevent occurrence of unnatural color reproduction for specific colors in a medium density area such as that a color of a face with a bright flesh color is reproduced to be more yellowish than its actual color, and thereby to obtain an excellent print on which natural colors are reproduced in the medium density area.

Item 6

The image reproducing system described in Item 5 wherein at least one of the conversion mode β of the image processing means is conversion mode γ which converts the read image information into the output image information so that following expression (6) may hold for logarithm E of arbitrary object brightness that satisfies following expression (5).

$$D(E3) \leqq D(E) \leqq D(E4) \qquad \text{Expression (5)}$$

$$1.0 \times A2 \leqq (D(E+0.1)-D(E)))/0.1 \leqq 2.0 \times A2 \qquad \text{Expression (6)}$$

provided that, $$A2=|(D(E3)-D(E2))/(E3-E2)|$$

$$D(E3)=Dmin+1.0$$

$$D(E4)=Dmin+1.5$$

In the invention described in Item 6, when the read image information is converted into the output image information by the conversion mode γ, dark colors on the print are made to be tight because a high density area is reproduced to be high in terms of contrast.

In an arrangement wherein at least one of the conversion mode γ of the image processing means is conversion mode δ which converts the read image information into the output image information so that following expression (7) may hold for logarithm E of arbitrary object brightness that satisfies the aforesaid expression (5), when the read image information is converted into the output image information by the conversion mode δ, there is offered an effect to improve tightness and minimum density of an image visually, because a high density area is reproduced to be higher than a medium density area in terms of contrast.

$$1.1 \times A2 \leqq (D(E+0.1)-D(E)))/0.1 \qquad \text{Expression (7)}$$

In the image reproducing system described in Item 5 wherein at least one of the conversion mode η of the image processing means is conversion mode θ which converts, for each primary color of the color print, the color read image information into the color output image information so that the aforesaid expression (6) may hold for logarithm E of arbitrary object brightness that satisfies the aforesaid expression (5) in Embodiment Item 6, in particular, when the color read image information is converted into the color output image information by the conversion mode θ, dark colors are made to be tight satisfactorily because a high density area is reproduced to be high in terms of contrast, and a high chroma object (whose luminance of one or two primary colors out of the primary colors of the color print is considerably low, namely reproduced in a high density area on a color print) can be reproduced on a print to be in an excellent color. Though colors and signals of an image pickup medium for each primary color have color cross-over generally, and color dyes forming a color print are not pure primary colors.

Item 7

The image reproducing system according to either one of Items 4–6 wherein the image processing means has, in addition to the conversion mode α, conversion mode ε which converts the read image information into the output image information in a way that following expression (8) or expression (9) is satisfied for logarithm E of partial object brightness that satisfies following expression (1), and following expression (10) holds for logarithm E of arbitrary object brightness that satisfies following expression (3).

$$D(E1) \leqq D(E) \leqq D(E2) \qquad \text{Expression (1)}$$

$$((D(E+0.1)-D(E)))/0.1<0.7 \qquad \text{Expression (8)}$$

$$1.3<((D(E+0.1)-D(E)))/0.1 \qquad \text{Expression (9)}$$

$$D(E2) \leqq D(E) \leqq D(E3) \qquad \text{Expression (3)}$$

$$1.2 \times A1<((D(E+0.1)-D(E)))/0.1 \qquad \text{Expression (10)}$$

provided that $$A1=|(D(E2)-D(E1))/(E2-E1)|$$

$$D(E3)=Dmin+1.0$$

In the invention described in Item 7, when the read image information is converted into the output image information by the conversion mode α, excellent gradation feeling and sufficient three-dimensional feeling can be obtained even when a bright color object is reproduced to be bright on a print, and when the read image information is converted into the output image information by the conversion mode ε, there is resulted conventional gradation reproduction which is generally conducted in the photographic industry, and it is possible to prevent that an object which is highly luminous compared with the primary object is reproduced to be white with no gradation on a print when it is photographed together with the primary object, whereby a print which keeps the gradation of an object which is highly luminous compared with the primary object can be obtained. Thus, it is possible to obtain excellent prints stably, by selecting a conversion mode which matches the scene.

In the image reproducing system according to either one of Items 4–6 wherein the image processing means has, in addition to the conversion mode ξ, conversion mode l which converts the color read image information into the color output image information in a way that the aforesaid expression (8) or expression (9) holds for logarithm E of partial object brightness that satisfies the aforesaid expression (1), and the aforesaid expression (10) holds for logarithm E of arbitrary object brightness that satisfies the aforesaid expression (3) in Embodiment 7, in particular, when the color read image information is converted into the color output image information by the aforesaid conversion mode ξ, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which color reproduction on the part of low luminance is excellent, and when the color read image information is converted into the color output image information by the conversion mode l, it is possible to dispense with the conversion to color coordinates systems in an even color space requiring complicated operations, and with color compression processing in the color coordinates systems in an even color space as well as the conversion from color coordinates systems in an even color space, it is possible to prevent that an object which is highly luminous compared with the primary object is reproduced to be white with no gradation on a print when it is photographed together with the primary object, whereby a print which keeps the gradation of an object which is highly luminous compared with the primary object can be obtained. Thus, it is possible to obtain excellent color prints with a conversion mode.

Item 8

An image processing apparatus which reads an image obtained through photographing of an object, and converts the read image information thus obtained into output image information for outputting a print that reproduces the object based on the output image information, wherein there is provided conversion mode α which converts the read image information into the output image information in a way that following expression (2) holds for logarithm E of arbitrary object brightness that satisfies following expression (1).

$$D(E1) \leqq D(E) \leqq D(E2) \qquad \text{Expression (1)}$$

$$0.7 \leqq ((D(E+0.1)-D(E)))/0.1 \leqq 1.3 \qquad \text{Expression (2)}$$

provided that D(E) represents density with which an object with luminance logarithm E is reproduced on a print, and Dmin represents minimum density reproducible on a print, and $$D(E1)=Dmin+0.15$$

$$D(E2)=Dmin+0.4$$

In the invention described in Item 8, when the read image information is converted into the output image information by the conversion mode α, it is possible to obtain a print which offers sufficient gradation feeling and three-dimensional feeling, even when an object with a bright color such as a face of a person with a bright flesh color is reproduced to be bright.

In the image processing apparatus which reads an image obtained through photographing of an object, and converts the read image information thus obtained into color output image information for outputting a color print that reproduces the object based on the color output image information, wherein there is provided conversion mode ξ which converts the color read image information into the color output image information in a way that the aforesaid expression (2) holds for logarithm E of arbitrary object brightness that satisfies the aforesaid expression (1) for each primary color of the color print in Embodiment Item 8, in particular, when the color read image information is converted into the color output image information by conversion mode ξ, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain color output image information which makes it possible to obtain a print on which the color reproduction on the part of low luminance is excellent.

Item 9

The image processing apparatus described in Item 8 wherein at least one of the conversion mode α is conversion mode β which converts the read image information into the output image information in a way that following expression (4) holds for logarithm E of arbitrary object brightness that satisfies following expression (3).

$$D(E2) \leqq D(E) \leqq D(E3) \qquad \text{Expression (3)}$$

$$1.0 \times A1 \leqq ((D(E+0.1)-D(E)))/0.1 \leqq 1.2 \times A1 \qquad \text{Expression (4)}$$

provided that $$A1=|(D(E2)-D(E1))/(E2-E1)|$$

$$D(E3)=Dmin+1.0$$

In the invention described in Item 9, when the read image information is converted into the output image information by the conversion mode β, the gradient of gradation reproduced on the density area where the density is higher by 0.4–1.0 than minimum density reproduced on a print is 1.0×A1–1.2×A1, which is ideal reproduction. Therefore, it is possible to secure a broad area for gradation reproduction while keeping excellent gradation feeling and sufficient three-dimensional feeling, and thereby to reproduce the objects covering from an object with a bright color to that with a dark color, with excellent gradation feeling and sufficient three-dimensional feeling.

In the image reproducing system described in Item 8 wherein at least one of the conversion mode ξ of the image processing means is conversion mode η which converts, for each primary color of the color print, the color read image information into the color output image information so that the aforesaid expression (4) may hold for logarithm E of arbitrary object brightness that satisfies the aforesaid expression (3), in particular, when the color read image information is converted into the color output image information by the conversion mode η, it is possible to prevent occurrence of unnatural color reproduction for specific colors in a medium density area such as that a color of a face of a person with a bright flesh color is reproduced to be more yellowish than its actual color, and thereby to obtain color output image information which makes it possible to obtain an excellent print on which natural colors are reproduced in the medium density area.

Item 10

The image processing apparatus described in Item 9 wherein at least one of the conversion mode β is conversion mode γ which converts the read image information into the output image information in a way that following expression (6) holds for logarithm E of arbitrary object brightness that satisfies following expression (5).

$$D(E3) \leqq D(E) \leqq D(E4) \quad \text{Expression (5)}$$

$$1.0 \times A2 \leqq (D(E+0.1)-D(E)))/0.1 \leqq 2.0 \times A2 \quad \text{Expression (6)}$$

provided that, $$A2 = |(D(E3)-D(E2))/(E3-E2)|$$

$$D(E3) = Dmin+1.0$$

$$D(E4) = Dmin+1.5$$

In the invention described in Item 10, when the read image information is converted into the output image information by the conversion mode γ, dark colors on the print are made to be tight because a high density area is reproduced to be high in terms of contrast.

In an arrangement wherein at least one of the conversion mode γ is conversion mode δ which converts the read image information into the output image information so that following expression (7) may hold for logarithm E of arbitrary object brightness that satisfies the aforesaid expression (5), when the read image information is converted into the output image information by the conversion mode δ, there is offered an effect to improve tightness and minimum density of an image visually, because a high density area is reproduced to be higher than a medium density area in terms of contrast.

$$1.1 \times A2 \leqq (D(E+0.1)-D(E)))/0.1 \quad \text{Expression (7)}$$

Though colors and signals of an image pickup medium for each primary color have color cross-over generally, and color dyes forming a color print are not pure primary colors, when the color read image information is converted into the color output image information by the conversion mode θ, in the image reproducing system described in Item 9 wherein at least one of the conversion mode η is conversion mode θ which converts, for each primary color of the color print, the color read image information into the color output image information so that the aforesaid expression (6) may hold for logarithm E of arbitrary object brightness that satisfies the aforesaid expression (5) in Embodiment Item 10, there is obtained color output image information which makes it possible to reproduce a high chroma object (whose luminance of several primary colors out of the primary colors of the color print is considerably low, namely reproduced in a high density area on a print) on a print to be in excellent color.

Item 11

The image processing apparatus according to either one of Items 8–10 wherein there is provided, in addition to the conversion mode α, the conversion mode ε which converts the read image information into the output image information in a way that following expression (8) or expression (9) is satisfied for logarithm E of partial object brightness that satisfies following expression (1), and following expression (10) holds for logarithm E of arbitrary object brightness that satisfies following expression (3).

$$D(E1) \leqq D(E) \leqq D(E2) \quad \text{Expression (1)}$$

$$((D(E+0.1)-D(E)))/0.1 < 0.7 \quad \text{Expression (8)}$$

$$1.3 < ((D(E+0.1)-D(E)))/0.1 \quad \text{Expression (9)}$$

$$D(E2) \leqq D(E) \leqq D(E3) \quad \text{Expression (3)}$$

$$1.2 \times A1 < ((D(E+0.1)-D(E)))/0.1 \quad \text{Expression (10)}$$

provided that $$A1 = (D(E2)-D(E1))/0.25$$

$$D(E3) = Dmin+1.0$$

In the invention described in Item 11, when the read image information is converted into the output image information by the conversion mode α, excellent gradation feeling and sufficient three-dimensional feeling can be obtained even when a bright color object is reproduced to be bright on a print, and when the read image information is converted into the output image information by the conversion mode ε, there is resulted conventional gradation reproduction which is generally conducted in the photographic industry, and it is possible to prevent that an object which is highly luminous compared with the primary object is reproduced to be white with no gradation on a print when it is photographed together with the primary object, whereby a print which keeps the gradation of an object which is highly luminous compared with the primary object can be obtained. Thus, it is possible to obtain excellent prints stably, by selecting a conversion mode which matches the scene.

In the image processing apparatus according to either one of Items 8–10 wherein there is provided, in addition to the conversion mode ξ, the conversion mode ι which converts the color read image information into the color output image information in a way that following expression (8) or expression (9) is satisfied for logarithm E of partial object brightness that satisfies the aforesaid expression (1) in Embodiment Item 11, and that following expression (10) holds for logarithm E of arbitrary object brightness that satisfies following expression (3). in particular, when the color negative image information is converted into the color output image information by the conversion mode ξ, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which the color reproduction on the part of low luminance is excellent, and when the color read image information is converted into the color output image information by the conversion mode l, it is possible to dispense with the conversion to color coordinates systems in an even color space requiring complicated operations, and with color compression processing in the color coordinates systems in an even color space as well as the conversion from color coordinates systems in an even color space, and to prevent that an object which is highly luminous compared with the primary object such as the snow surface or a white dress is reproduced to be white with no gradation on a color print when it is photographed, whereby a color print which keeps the gradation of an object which is highly luminous compared with the primary object can be obtained, making it possible to obtain excellent prints stably, by selecting an appropriate conversion mode which matches the scene.

Item 12

An image reproducing system having therein a reading means which reads negative film density image information from a color negative film obtained through photographing of an object on a silver halide color negative film for photographing use, an image processing means which converts the negative film density image information into output image information, and an image outputting means which outputs a print reproducing the object based on the output image information, wherein the image processing means has therein conversion mode κ which converts the negative film density image information into the output image information in a way that expression (12) holds for arbitrary density N of a color negative film satisfying following expression (11).

$$D(N1) \leqq D(N) \leqq D(N2) \qquad \text{Expression (11)}$$

$$1.2 \leqq ((D(N+0.1)-D(N)))/0.1 \leqq 1.8 \qquad \text{Expression (12)}$$

provided that D(N) represents density with which an image on a color negative film having density N is reproduced on a print, and Dmin represents minimum density reproducible on a print, and $$D(N1)=Dmin+0.15$$

$$D(N2)=Dmin+0.4$$

In the invention described in Item 12, data for converting with the conversion mode κ can be obtained easily, and when the negative film density image information is converted into the output image information by the conversion mode κ, it is possible to obtain a print which offers excellent gradation feeling and three-dimensional feeling, even when an object with a bright color such as a face of a person with a bright flesh color is reproduced to be bright.

In the image reproducing system having therein a reading means which reads color negative film density image information from a color negative film obtained through photographing of an object on a silver halide color negative film for photographing use, an image processing means which converts the color negative film density image information into the color output image information, and an image outputting means which outputs a color print reproducing the object based on the color output image information, wherein the image processing means has conversion mode ν which converts the color negative film density image information into the color output image information in a way that the aforesaid expression (2) holds for logarithm E of arbitrary object brightness that satisfies the aforesaid expression (1) concerning each primary color out of those for blue, green and red, in Embodiment Item 12, in particular, when the color negative film density image information is converted into the color output image information by the conversion mode ν, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which the color reproduction on the part of low luminance is excellent.

Item 13

The image reproducing system described in Item 12 wherein at least one of the conversion mode κ of the image processing means is conversion mode λ which converts the negative film density image information into the output image information in a way that following expression (14) holds for arbitrary density N of a color negative film satisfying following expression (13).

$$D(N2) \leqq D(N) \leqq D(N3) \qquad \text{Expression (13)}$$

$$1.0 \times A3 \leqq ((D(N+0.1)-D(N)))/0.1 \leqq 1.2 \times A3 \qquad \text{Expression (14)}$$

provided that $$A3=|(D(N2)-D(N1))/(N2-N1)|$$

$$D(N3)=Dmin+1.0$$

In the invention described in Item 13, data for converting with the conversion mode λ can be obtained easily, and when the negative film density image information is converted into the output image information by the conversion mode λ, the gradient of gradation reproduced on the density area where the density is higher by 0.4–1.0 than minimum density reproduced on a print represents an ideal reproduction, and it is possible to secure a broad area for gradation reproduction while keeping excellent gradation feeling and sufficient three-dimensional feeling, and thereby to reproduce objects covering from an object with a bright color to that with a dark color, with excellent gradation feeling and sufficient three-dimensional feeling.

In the image reproducing system described in Embodiment Item 12 wherein at least one of the conversion mode α of the image processing means is conversion mode ξ which converts the color negative film density image information into the color output image information in a way that the aforesaid expression (14) holds for arbitrary density N of a color negative film satisfying the aforesaid expression (13), in particular, when the color negative film density image information is converted into the color output image information by the conversion mode ξ, it is possible to prevent occurrence of unnatural color reproduction for specific colors in a medium density area such as that a color of a face with a bright flesh color is reproduced to be more yellowish than its actual color, and thereby to obtain an excellent print on which natural colors are reproduced in the medium density area.

Item 14

The image reproducing system described in Item 13 wherein at least one of the conversion mode λ of the image processing means is conversion mode $\mu$ which converts the negative film density image information into the output image information in a way that following expression (16) holds for arbitrary density N of a color negative film satisfying following expression (15).

$$D(N3) \leqq D(N) \leqq D(N4) \quad \text{Expression (15)}$$

$$1.1 \times A4 \leqq ((D(N+0.1)-D(N)))/0.1 \leqq 2.0 \times A4 \quad \text{Expression (16)}$$

provided that $$A4=|(D(N3)-D(N2))/(N3-N2)|$$

$$D(N3)=Dmin+1.0$$

$$D(N4)=Dmin+1.5$$

In the invention described in Item 14, data for converting with the conversion mode $\mu$ can be obtained easily, and when the negative film density image information is converted into the output image information by the conversion mode $\mu$, dark colors are reproduced to be tight on a print, and tightness and minimum density of an image are improved visually because a high density area is reproduced to be higher than a medium density area in terms of contrast.

In the image reproducing system described in Embodiment Item 13 wherein at least one of the conversion mode $\xi$ of the image processing means is conversion mode o which converts the color negative film density image information into the color output image information in a way that the aforesaid expression (16) holds for logarithm E of arbitrary object brightness satisfying the aforesaid expression (15) for each primary color of those for blue, green and red, in particular, when the color negative film density image information is converted into the color output image information by the conversion mode o, dark colors are made to be tight satisfactorily because a high density area is reproduced to be high in terms of contrast, and a high chroma object (whose luminance of one or two primary colors out of blue, green and red primary colors of the color print is considerably low, namely reproduced in a high density area on a print) can be reproduced on a print to be in an excellent color, though colors and signals of an image pickup medium for each primary color have color cross-over generally, and color dyes forming a color print are not pure primary colors.

The image reproducing system described in either one of Items 12–14 wherein an average density calculating means to obtain average negative film density information of the image from the aforesaid negative film density image information is provided, and the image processing means mentioned above converts the negative film density image information into output image information in a way that an image with density which is the sum of the average negative film density indicated by the average negative film density information obtained by the average density calculating means and a correction value is reproduced to be an image with density ranging from Dmin+0.6 to Dmin+1.0 on a print.

Due to the invention described in Item 15, it is possible to cover a broad latitude of a color negative film and to obtain a quality print stably.

Due to the image reproducing system described in either one of Embodiment Items 12–14 wherein the image processing means mentioned above obtains average negative film density information for each of blue, green and red primary colors of the image from the color negative film density image information, and converts the negative film density image information into output image information in a way that an image with density which is the sum of the average negative film density indicated by the average negative film density information for each of blue, green and red primary colors thus obtained and a correction value for each of blue, green and red primary colors is reproduced to be an image with density ranging from Dmin+0.6 to Dmin+1.0 on a print in Embodiment Item 15, in particular, a broad latitude of a color negative film can be covered and a quality print can be obtained stably.

Item 16

The image reproducing system described in Item 15 having therein an input means to input a manual correction value and a correction value calculation means which automatically obtains a correction value through a prescribed calculation from the negative film density image information, then adds the manual correction value inputted by the input means to the correction value obtained automatically when the manual correction value is inputted by the input means, and thereby obtains the correction value, wherein the image processing means converts the negative film density image information into output image information in a way that an image with density which is the sum of the average density indicated by the average negative film density information obtained by the average density calculating means and the correction value obtained by the correction value calculating means is reproduced to be an image with density ranging from Dmin+0.6 to Dmin+1.0 on a print.

In the invention described in Item 16, prints having constant quality can simply be obtained because a correction value is calculated automatically, and when a manual correction value is inputted by the input means, a manual correction value inputted by the input means is added to the correction value obtained automatically, which makes it easy to obtain a print having luminance which is more suitable for tastes.

In the image reproducing system described in Embodiment Item 15 having therein an input means to input a manual correction value for each of blue, green and red primary colors and a correction value calculation means which automatically obtains a correction value for each of blue, green and red primary colors through a prescribed calculation from the negative film density image information, then adds the manual correction value for each of blue, green and red primary colors inputted by the input means to the correction value for each of blue, green and red primary colors obtained automatically when the manual correction value for each of blue, green and red primary colors is inputted by the input means, and thereby obtains the correction value for each of blue, green and red primary colors, wherein the image processing means converts the negative film density image information into output image information in a way that an image with density which is the sum of the average density indicated by the average negative film density information for each of blue, green and red primary colors obtained by the average density calculating means and the correction value for each of blue, green and red primary colors obtained by the correction value calculating means is reproduced to be an image with density for each of blue, green and red primary colors ranging from Dmin+0.6 to Dmin+1.0 on a print in Embodiment Item 16, in particular, prints having constant quality can simply be obtained because a correction value for each of blue, green and red primary colors is calculated automatically, and when a manual correction value for each of blue, green and red primary colors is inputted by the input means, a manual correction value for each of blue, green and red primary colors inputted by the input means is added to the correction value for each of blue, green and red primary colors obtained automatically, which makes it easy to obtain a color print having luminance and color tone which are more suitable for tastes.

Item 17

The image reproducing system described in either one of Items 12–14 wherein the reading means is one capable of obtaining reversal density image information from a color reversal film obtained by photographing an object on a silver halide color reversal film for photographing use, a conversion means which converts the reversal film density image information into image information corresponding to negative film density that corresponds to the negative film density image information is provided, and the image processing means is one to convert the image information corresponding to negative film density converted by the conversion means to output image information.

The invention described in Item 17 offers an effect that, even from reversal film density image information, it is possible to obtain, by converting with data which can be obtained easily, a print which offers sufficient gradation feeling and three-dimensional feeling, even when an object with a bright color such as a face of a person with a bright flesh color is reproduced to be bright.

In the image reproducing system described in either one of Items 12–14 wherein the reading means is one capable of obtaining color reversal density image information from a color reversal film obtained by photographing an object on a silver halide color reversal film for photographing use, the image processing means has a conversion means which converts the color reversal film density image information into image information corresponding to color negative film density which corresponds to the color negative film density image information, and the image processing means is one to convert the image information corresponding to color negative film density converted by the conversion means into color output image information in Embodiment Item 17, in particular, when converting with data which can be obtained easily even from color reversal film density image information, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which the color reproduction on the part of low luminance is excellent, and even when an object with a bright color such as a face of a person with a bright flesh color is reproduced to be a highlight, it is possible to obtain an effect that excellent gradation feeling is obtained and a print showing three-dimensional feeling is obtained.

Item 18

The image reproducing system described in Item 17 wherein the reversal film density image information is converted by the conversion means into read image information which corresponds to image information corresponding to the negative film density, based on conversion information obtained by correlating the negative film density information of an image on the color negative film obtained by photographing the same object under the same condition on a silver halide color negative film for photographing use with that of an image on the color reversal film obtained by photographing the same object under the same condition on a silver halide color reversal film for photographing use.

The invention described in Item 18 offers an effect that it is possible to obtain, by converting with conversion information which can be obtained easily, excellent gradation feeling and thereby a print having three-dimensional feeling, even when an object with a bright color such as a face of a person with a bright flesh color is reproduced to be bright.

In the the image reproducing system described in Item 17 wherein the color reversal film density image information is converted into image information corresponding to the negative film density, based on conversion information obtained by correlating the negative film density information for each of red, green and blue primary colors of an image on the color megative film obtained by photographing the same object under the same condition on a silver halide color negative film for photographing use with that of an image on the color reversal film obtained by photographing the same object under the same condition on a silver halide color reversal film for photographing use, in particular, when converting with conversion information which can be obtained easily, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which the color reproduction on the part of low luminance is excellent, and even when an object with a bright color such as a face of a person with a bright flesh color is reproduced to be a highlight, it is possible to obtain an effect that excellent gradation feeling is obtained and a print showing three-dimensional feeling is obtained.

Item 19

The image reproducing system described in Item 17 or Item 18 having therein an input means to input a manual correction value, wherein, when a manual correction value is inputted from an image having density DT shown by the reference reversal film density information determined in advance or from the aforesaid input means, the image processing means converts the negative film density image information into output image information in a way that an image with density which is the sum of density DT shown by the reference reversal film density information and the inputted manual correction value is reproduced to be an image having density ranging from Dmin+0.6 to Dmin+1.0., while satisfying the following condition.

$$0.8 \leqq DT \leqq 1.5$$

Due to the invention described in Item 19, it is possible to cover a latitude of a color reversal film and to obtain stably a print having luminance which is intended by a photographer.

Due to the image reproducing system described in Item 17 or Item 18 having therein an input means to input a manual correction value for each of blue, green and red primary colors, wherein, when a manual correction value is inputted from an image having density DT shown by the reference reversal film density information determined for each of blue, green and red primary colors in advance or from the aforesaid input means, the image processing means converts the negative film density image information into output image information in a way that an image with density which is the sum of density DT shown by the reference reversal film density information and the inputted manual correction value is reproduced to be an image having density ranging from Dmin+0.6 to Dmin+1.0., while satisfying the condition of $0.8 \leqq DT \leqq 1.5$, in particular, it is possible to cover a latitude of a color reversal film and to obtain stably a print having luminance and color tone which are intended by a photographer.

Item 20

The image reproducing system described in either one of Items 12–14 having therein a photographed image information acquiring means to acquir photographed image information obtained by photographing an object with a digital camera, and a conversion means which converts the photographed image information into image information corresponding to negative film density which corresponds to the negative film density image information, wherein the image processing means converts image information corresponding to the negative film density converted by the conversion means.

In the invention described in Item 20, when converting with data which can be obtained easily, it is possible to obtain an effect that excellent gradation feeling is obtained and a print showing three-dimensional feeling is obtained, even from photographed image information obtained by photographing an object with a digital camera.

Due to the image reproducing system described in either one of Items 12–14 wherein the reading means has therein a photographed image information acquiring means to acquir photographed image information obtained by photographing an object with a digital camera, and a conversion means which converts the color photographed image information into image information corresponding to color negative film density which corresponds to the color negative film density image information, and the image processing means converts image information corresponding to the color negative film density converted by the conversion means into color output image information, in Embodiment Item 20, in particular, when converting with data obtained easily, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which the color reproduction on the part of low luminance is excellent, and even when an object with a bright color such as a face of a person with a bright flesh color is reproduced to be a highlight, it is possible to obtain an effect that excellent gradation feeling is obtained and a print showing three-dimensional feeling is obtained, even from color photographed image information obtained by photographing an object with a digital camera.

Item 21

The image reproducing system described in Item 20 wherein the photographed image information is converted by the conversion means into image information which corresponds to the negative film density, based on conversion information obtained by correlating the negative film density information of an image on the color megative film obtained by photographing the same object under the same condition on a silver halide color negative film for photographing use with that of an image on the digital camera obtained by photographing the same object under the same condition on the digital camera.

The invention described in Item 21 offers an effect that it is possible to obtain, by converting with conversion information which can be obtained easily, excellent gradation feeling and thereby a print having three-dimensional feeling, even when an object with a bright color such as a face of a person with a bright flesh color is reproduced to be bright.

Due to the image reproducing system described in Embodiment Item 20 wherein the color photographed image information is converted by the conversion means into image information which corresponds to the color negative film density, based on conversion information obtained by correlating the negative film density information for each of red, green and blue primary colors of an image on the color megative film obtained by photographing the same object under the same condition on a silver halide color negative film for photographing use with color photographed image information for each of red, green and blue primary colors on the digital camera obtained by photographing the same object under the same condition on the digital camera in Embodiment Item 21, in particular, it is possible to dispense with the conversion to color coordinates systems in an even color space requiring complicated operations, and with color compression processing in the color coordinates systems in an even color space as well as the conversion from color coordinates systems in an even color space, and to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which the color reproduction on the part of low luminance is excellent, and even when an object with a bright color such as a face of a person with a bright flesh color is reproduced to be a highlight, it is possible to obtain an effect that excellent gradation feeling is obtained and a print showing three-dimensional feeling is obtained, even from color photographed image information obtained by photographing an object with a digital camera.

Item 22

The image reproducing system described in Item 20 or Item 21 having therein an input means to input a manual correction value, wherein, when a manual correction value is inputted from an image of reference value determined in advance of photographed image information or from the input means, the image processing means converts the negative film density image information into output image information in a way that an image with density which is the sum of the reference value and the manual correction value is reproduced to be an image having density ranging from Dmin+0.6 to Dmin+1.0.

The invention described in Item 22 makes it possible to cover a latitude of a digital camera and to obtain stably a quality print.

Due to the image reproducing system described in Item 20 or Item 21 having therein an input means to input a manual correction value for each of blue, green and red primary colors, wherein, when a manual correction value is inputted in each of blue, green and red primary colors from an image of reference value determined in advance of photographed image information or from the input means, the image processing means converts the negative film density image information into output image information in a way that an image with density which is the sum of the reference value and the manual correction value is reproduced to be an image having density ranging from Dmin+0.6 to Dmin+1.0., in particular, it is possible to cover a latitude of a digital camera and to obtain stably a quality color print.

Explanation of Terminology

An image recording medium is a medium on which an image is recorded, and an example of the image recording medium includes photographic image recording media such as a color film and a color photographic paper on which an image is recorded as a photographic image, electronic image recording media such as a memory card on which a digitized image is recorded electronically, magnetic image recording media such as a floppy disk on which a digitized image is recorded magnetically, and photo-magnetic image recording media such as an MO on which a digitized image is recorded photo-magnetically.

A print is one on which a visible image is recorded to be durable. The print includes those to be observed by reflected light and those to be observed by transmitted light. The print further includes a color print on which a color image is recorded and a monochromatic print on which a monochromatic image is recorded.

A digital camera is an image input apparatus which photographs an object image and outputs digitized image signals of the object image, and a common digital camera is one which photographs an object by the use of an electronic image pickup element such as a CCD and outputs digitized image signals of the object image.

Exposure amount information is information showing an exposure amount to be given to a light-sensitive material for print use, and it may be represented by either an exposure amount itself to be given to a light-sensitive material for print use, or a logarithmic exposure amount (a logarithm of an exposure amount), or a relative value of an exposure amount. Color exposure amount image information is digital image information wherein a color image is shown with exposure amount information.

Density information is information showing optical density on a print, and it may be represented by either density itself, reflection factor, transmission factor, photo-absorption factor, or function values each being in a relation of one-to-one correspondence with the foregoing. Density image information is digital image information wherein an image is shown with density information. Further, color density image information is digital image information wherein a color image is shown with density information for each primary color on a print.

Negative film density information is information showing optical density of an image recorded on a color negative film, and it may be represented by either density itself, reflection factor, transmission factor, photo-absorption factor, or function valaues each being in a relation of one-to-one correspondence with the foregoing. Negative film density image information is digital image information on which an image recorded on a color negative film is shown with negative film density information. Color negative film density image information is digital image information on which a color image recorded on a color negative film is shown with negative film density information for each primary color.

Average negative film density information is negative film density information on which negative film density image information for one imge plane is averaged.

Reversal film density information is information showing optical density of an image recorded on a color reversal film, and it may be represented by either density itself, reflection factor, transmission factor, photo-absorption factor, or function valaues each being in a relation of one-to-one correspondence with the foregoing. Further, reversal film density image information is digital image information on which an image recorded on a color reversal film is shown with reversal film density information. Furthermore, color reversal film density image information is digital image information on which a color image recorded on a color reversal film is shown with reversal film density information for each primary color.

Reference reversal film density information is reversal film density information wherein reproduction in density ranging from Dmin+0.6 to Dmin+1.0 is a preferable reference.

A camera output value is an output value obtained by reading an image recording medium on which an output value of an image signal outputted after photographing an object with a digital camera or the image signal is recorded. Photographed image information is an image signal obtained by reading an image recording medium on which an image signal outputted after photographing an object with a digital camera or the image signal is recorded. Color photographed image information is a color image signal obtained by reading an image recording medium on which a color image signal outputted after photographing an object with a digital camera or the color image signal is recorded.

A reference value of photographed image information is a camera output value wherein reproduction in density ranging from Dmin+0.6 to Dmin+1.0 is a preferable reference.

Negative film-equivalent density image information is information showing optical density of an image recorded on a color negative film for object brightness which corresponds to image information obtained by reading an image recording medium other than a silver halide color negative film or to image information obtained directly by photographing an object, and it may be represented by either density itself, reflection factor, transmission factor, photo-absorption factor, or function valaues each being in a relation of one-to-one correspondence with the foregoing. Negative film-equivalent density image information is digital image information wherein an image is shown with information corresponding to negative film density. Image information corresponding to color negative film density is digital image information wherein a color image is shown with negative film density information for each primary color.

Read image information is an image obtained by reading an image obtained by photographing an object. Color read image information is a color image obtained by reading a color image obtained by photographing an object.

Output image information is digital image information wherein an image is shown with an output value outputted to an image output means. Color output image information is digital image information wherein a color image is shown with an output value for each primary color from the image output means outputted to an image output means. As the image output which outputs an image based on output image information or color output image information, there are given an apparatus which outputs an image by moving a light-sensitive material for exposure thereto relatively to a linear group of light-emitting elements which emits light based on output image information, an apparatus which outputs an image by moving a light-sensitive material for exposure thereto relatively to a linear group of light-shielding elements which shields against emission from a linear light source based on color output image information, an apparatus which outputs an image through contact exposure to a light-sensitive material conducted by a surface group of light-emitting elements which emits light based on color output image information, an apparatus which outputs an image through contact exposure to a light-sensitive material conducted by a surface group of light-shielding elements which shields against light emitted from the surface light-emitting source based on color output image information, an apparatus which outputs an image through projection exposure to a light-sensitive material conducted by a surface group of light-shielding elements which shields against light from the surface light-emitting source based on color output image information, an apparatus which outputs an image by scanning a light-sensitive material with converged light such as a laser beam emitted based on color output image information, and an apparatus which outputs an image by scanning a light-sensitive material while shielding against converged light such as a laser beam based on color output image information.

As the apparatus which outputs an image through projection exposure to a light-sensitive material conducted by a surface group of light-shielding elements which shields against light from the surface light-emitting source based on color output image information, there are given an apparatus which outputs an image through projection exposure to a light-sensitive material conducted by a CRT which emits light in accordance with color output image information, and an apparatus which outputs an image through projection exposure to a light-sensitive material conducted by a TFT lelement which emits light in accordance with color output image information.

A characteristics curve is one generally showing the relation between an input amount and an output amount. For example, a characteristics curve related to a light-sensitive material for print use is one showing the relation between exposure amount information for exposure to be given to a light-sensitive material for print use and density information of a print obtained from the exposed light-sensitive material for print use, in exposure of color balance which makes it possible to obtain a neutral color, while a characteristics curve of a digital camera is one showing the relation between exposure amount information for exposure to be given to a digital camera and a value of photographed image information obtained from the digital camera, and a characteristics curve related to a light-sensitive film such as a silver halide color reversal film for photographing use and a silver halide color netative film for photographing use is one showing the relation between exposure amount information for exposure to be given to a light-sensitive film and density information of the film obtained in the exposure, in exposure for neutral color.

Neutral color is one wherein an amount of light is mostly the same for blue, green and red, and exposures conducted by D50 light source and D65 light source stipulated in CIE are included. In some cases, those exposed by exposure for neutral color (for example, exposure by D50 light source or D65 light source stipulated in CIE) are called a neutral color. Blue, green and red represent those which are three primary colors of light, while each of yellow, magenta and cyan is light wherein two colors out of blue, green and red representing the three primary colors of light are mixed to be the same in amount each other and an amount of the rest mixed is negligible.

DETAILED DESCRIPTION OF THE PREFERRED EMBODIMENT

A concrete example related to the invention will be shown as follows as an embodiment to which the invention is not limited. In the embodiment, there are made conclusive remarks which, however, represent preferable examples of the invention, and they limit neither the meaning of terminology nor the technical scope of the invention.

Embodiment 1

Apparatus Structure

Figure 1:
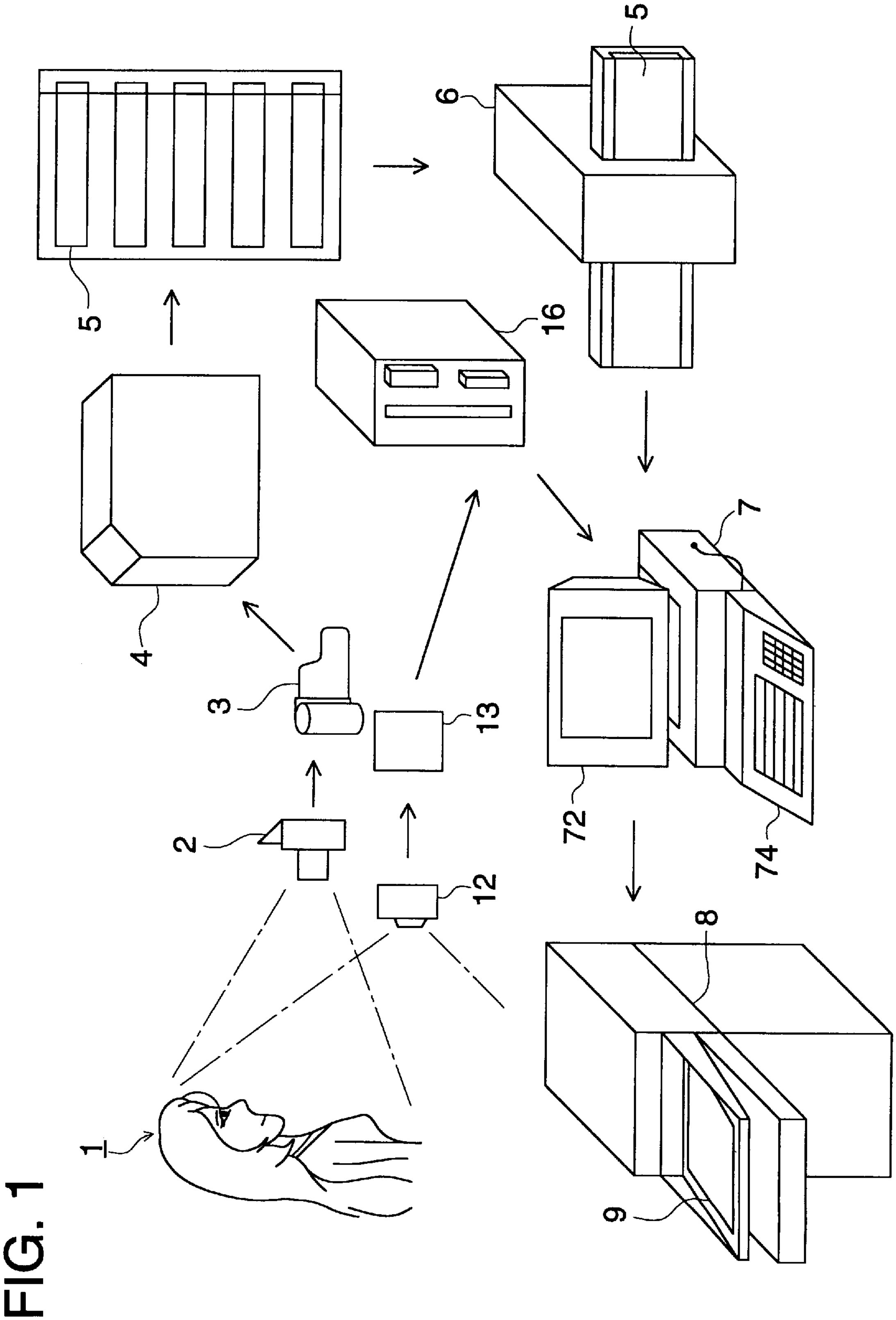
FIG. 1 is a schematic structure diagram of an image reproducing system in Embodiments 1 and 2.

An image reproducing system of the present embodiment is provided, as shown in FIG. 1, with reading apparatus 6 which conducts image pickup for color negative film or color reversal film 5 obtained by photographing object 1 and obtains color negative film density image information or color reversal film density image information for blue, green and red, image processing apparatus 7 which converts the color negative film density image information or color reversal film density image information for blue, green and red obtained by the reading apparatus 6 into color output image information for blue, green and red, and image outputting device 8 which outputs color print 9 reproducing the object 1 based on the color output image information for blue, green and red obtained by the image processing apparatus 7.

An image reproducing system of the present embodiment is provided, as shown in FIG. 1, with recording medium reading apparatus 16 which obtains color photographed image information for blue, green and red from image recording medium 13 on which color photographed images for blue, green and red obtained by photographing object 1 with digital camera 12 are recorded, image processing apparatus 7 which converts the color photographed image information for blue, green and red obtained by the recording medium reading apparatus 16 into color output image information, and image outputting device 8 which outputs color print 9 reproducing the object 1 based on the color output image information obtained by the image processing apparatus 7.

Incidentally, in general, a silver halide color negative film for general photographing use having therein a blue-sensitive and yellow color forming layer, a green-sensitive and magenta color forming layer and a red-sensitive and cyan color forming layer, or a silver halide color reversal film for general photographing use having therein a blue-sensitive and yellow color forming layer, a green-sensitive and magenta color forming layer and a red-sensitive and cyan color forming layer 3 is loaded in camera 2, and when the camera 2 photographs object 1, the silver halide color negative film for general photographing use or the silver halide color reversal film for general photographing use 3 on which a latent image of the object 1 is formed can be obtained. Then, the silver halide color negative film for general photographing use or the silver halide color reversal film for general photographing use 3 on which a latent image of the object 1 is formed thus obtained is processed by film developing unit 4, and color negative film or color reversal film 5 is obtained. Incidentally, it is a matter of course that the silver halide color negative film for general photographing use 3 is processed by the film developing unit for a negative film 4 to turn into the color negative film 5, and the silver halide color reversal film for general photographing use 3 is processed by the film developing unit for a reversal film 4 to turn into the color reversal film 5.

Digital camera 12 in the present embodiment is one wherein a subject is photographed by an electronic image pickup element such as a CCD image pickup element and digitized image signals are outputted.

Reproduction from a Color Negative Film

Color negative film density image information for blue, green and red obtained by reading apparatus 6 in the present embodiment is density image information wherein images recorded on color negative film 5 are expressed with density for blue, green and red. Image outputting apparatus 8 of the present embodiment is an apparatus wherein a color photographic paper representing a silver halide color photographic light-sensitive material for print use having thereon a blue-sensitive yellow color forming layer, a green-sensitive magenta color forming layer, and a red-sensitive cyan color forming layer is exposed to light based on color output image information for blue, green and red to output color print 9 reproducing subject 1. Incidentally, this color photographic paper is also a light-sensitive material having thereon plural light-sensitive layers each having a different color sensitivity for each primary color. Color output image information obtained by image processing apparatus 7 of the present embodiment is color exposure amount image information wherein an image is expressed with common logarithm E of an amount of exposure for blue, green and red to be given to the aforesaid color photographic paper.

Figure 2:
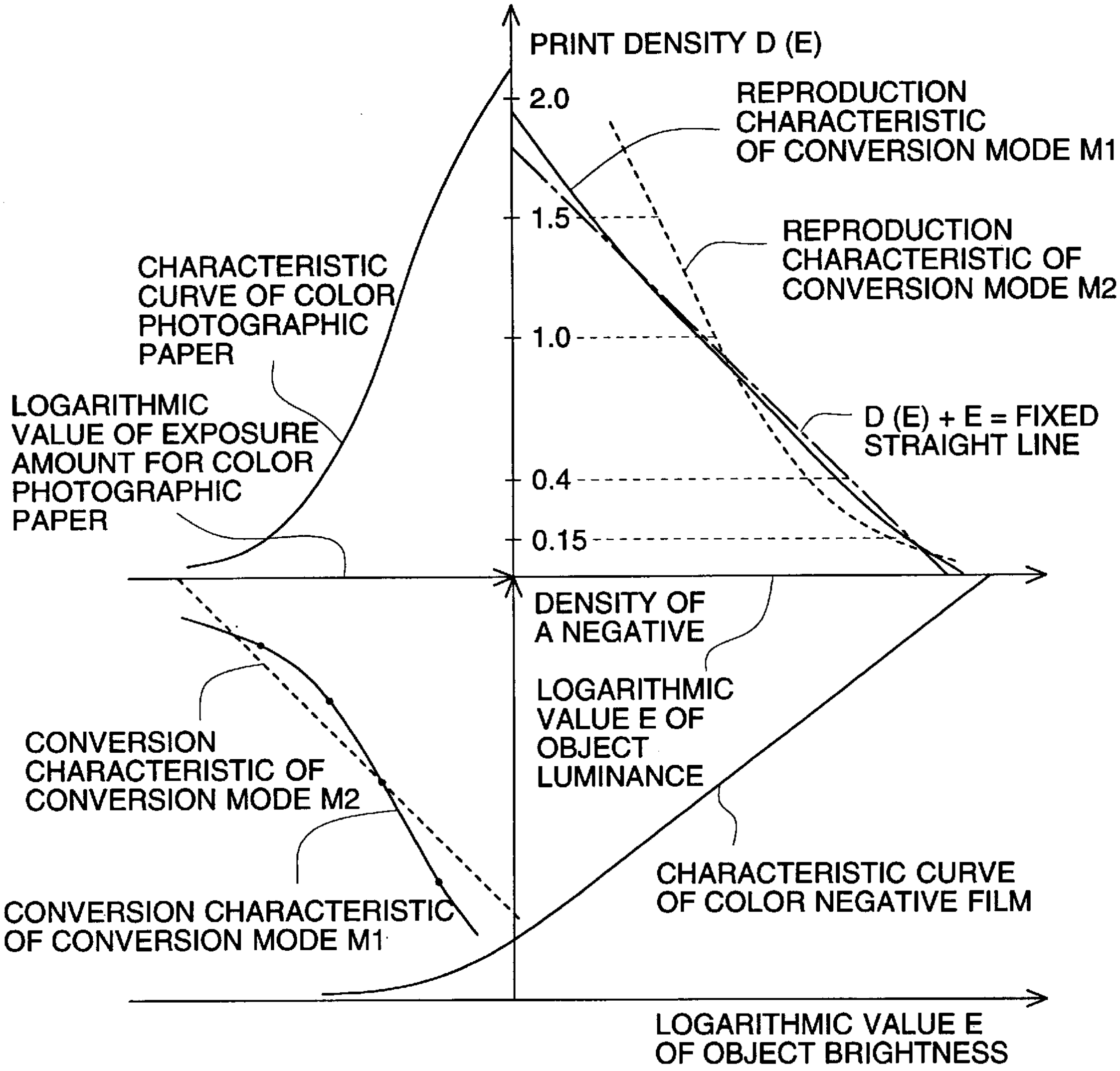
FIG. 2 is a diagram showing reproduction characteristics and characteristic curves of a color negative film in Embodiment 1.

The image processing apparatus 7 of the present embodiment converts color negative film density image information for blue, green and red obtained by reading apparatus 6 into color output image information for blue, green and red, through conversion having conversion characteristics shown with a solid line in the lower left quadrant in FIG. 2, in conversion mode M1. Due to this, subject 1 of common logarithm E of brightness is reproduced to be of density D(E) on color print 9, as shown with reproduction characteristic indicated with a solid line in the upper right quadrant in FIG. 2. Incidentally, in the lower right quadrant in FIG. 2, there is shown a characteristic curve of a silver halide color negative film for general photographing use, and in the upper left quadrant in FIG. 2, there is shown a characteristic curve of a color photographic paper. The axis of ordinates for the upper right quadrant and the upper left quadrant in FIG. 2 represents density D(E) on a color print, and the axis of ordinates for the lower right quadrant and the lower left quadrant in FIG. 2 represents negative film density on the color negative film obtained by processing a silver halide color negative film for general photographing use, while the axis of abscissas for the upper right quadrant and the lower right quadrant in FIG. 2 represents common logarithm E of brightness of subject 1 and the axis of abscissas for the upper left quadrant and the lower left quadrant in FIG. 2 represents a common logarithm of an amount of exposure to be given to a color photographic paper.

Conversion of a uniform color space to the color specification which requires complicated operation, color compression processing in the color specification of the uniform color space and conversion of a uniform color space from the color specification are made to be unnecessary by the conversion mode M1. Due to this conversion mode M1, subject 1 of common logarithm E of brightness is reproduced to be of density D(E) on color print 9, as shown in the upper right quadrant in FIG. 2. Reproduction characteristics shown in the upper right quadrant in FIG. 2 appear. The reproduction characteristics will be explained as follows. In the reproduction characteristics, the following Expression (2) holds for common logarithm E of arbitrary subject brightness satisfying the following Expression (1) with regard to each primary color for blue, green and red.

$$D(E1) \leqq D(E) \leqq D(E2) \qquad \text{Expression (1)}$$

$$0.7 \leqq ((D(E+0.1)-D(E)))/0.1 \leqq 1.3 \qquad \text{Expression (2)}$$

In the expression, D(E) shows density with which a subject with luminance common logarithm E is reproduced on a color print, and Dmin shows minimum density which can be reproduced on a color print, and following expression hold.

$$D(E1)\ Dmin+0.15$$

$$D(E2)=Dmin+0.4$$

Due to this, even when a subject having bright color is reproduced to be in bright color, excellent feeling of gradation can be obtained, and sufficient three-dimensional feeling can be obtained. Further, it is possible to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which the color reproduction on the part of low luminance is excellent.

Further, in the reproduction characteristics, the following Expression (4) holds for common logarithm E of arbitrary subject brightness satisfying the following Expression (3) with regard to each primary color for blue, green and red.

$$D(E2) \leqq D(E) \leqq D(E3) \qquad \text{Expression (3)}$$

$$1.0 \times A1((D(E+0.1)-D(E)))/0.1 \leqq 1.2 \times A1 \qquad \text{Expression (4)}$$

In the expression, the following expressions hold.

$$A1=|(D(E2)-D(E1))/(E2-E1)|$$

$$D(E3)=Dmin+1.0$$

Due to this, the gradient of gradation reproduced on the density area where the density is higher by 0.4–0.8 than minimum density reproducible on a color print represents an ideal reproduction to be 1.0×A1–1.2×A1, and thereby it is possible to secure a broad area for gradation reproduction while keeping excellent gradation feeling and sufficient three-dimensional feeling, and it is possible to prevent occurrence of unnatural color reproduction for specific colors in a medium density area such as that a color of a face with a bright flesh color is reproduced to be more yellowish than its actual color, and thereby to obtain an excellent color print on which natural colors are reproduced in the medium density area.

Further, in the reproduction characteristics, the following Expressions (6–7) hold for common logarithm E of arbitrary subject brightness satisfying the following Expression (5).

$$D(E3) \leqq D(E) \leqq D(E4) \qquad \text{Expression (5)}$$

$$1.1 \times A2(D(E+0.1)-D(E)))/0.1 \leqq 2.0 \times A2 \qquad \text{Expressions (6–7)}$$

In the expression, the following expressions hold.

$$A2=|(D(E3)-D(E2))/(E3-E2)|$$

$$D(E3)=Dmin+1.0$$

$$D(E4)=Dmin+1.5$$

Due to this, dark colors on a print are made to be tight satisfactorily because a high density area is reproduced to be higher in terms of contrast than a medium density area, and tightness and minimum density of an image are visually improved. Further, though colors and signals of an image pickup medium for each primary color have color crossover, and color dyes forming a color print are not pure primary colors generally, a subject with high chroma (luminance of one or two primary colors among primary colors of blue, green and red is considerably low, namely reproduced to be a high density area on a color print) can be reproduced to be of an excellent color on a color print.

The image processing apparatus 7 of the present embodiment converts color negative film density image information for blue, green and red obtained by reading apparatus 6 into color output image information for blue, green and red, through conversion wherein the color negative film density image information is just subtracted from the prescribed constant, in conversion mode M2 of conversion characteristics and reproduction characteristics shown with broken lines in FIG. 2. Due to this, with regard to primary colors for blue, green and red, color negative film density image information for blue, green and red is converted into color output image information so that the following Expression (8) or (9) may hold for common logarithm E of a partial subject brightness satisfying the following Expression (1) and Expression (9) may hold for common logarithm E of arbitrary subject brightness satisfying the following Expression (3).

$$D(E1) \leqq D(E) \leqq D(E2) \qquad \text{Expression (1)}$$

$$((D(E+0.1)-D(E)))0.1<0.7 \qquad \text{Expression (8)}$$

$$1.3<((D(E+0.1)-D(E)))/0.1 \qquad \text{Expression (9)}$$

$$D(E2) \leqq D(E) \leqq D(E3) \qquad \text{Expression (3)}$$

$$1.2 \times A1<((D(E+0.1)-D(E)))/0.1 \qquad \text{Expression (10)}$$

In the expression, the following expressions hold.

$$A1=|(D(E2)-D(E1))/(E2-E1)|$$

$$D(E1)=Dmin+0.15$$

$$D(E2)=Dmin+0.4$$

$$D(E3)=Dmin+1.0$$

Due to conversion mode M2, conventional photographic gradation can be obtained, and it is possible to prevent that an object which is highly luminous compared with the primary object is reproduced to be white with no gradation on a color print when it is photographed together with the primary object, whereby a color print which keeps the gradation of an object which is highly luminous compared with the primary object can be obtained.

As stated above, in the image processing apparatus 7, even in the case of reproduction from a color negative film, an excellent color print corresponding to each scene can be obtained by selecting an appropriated conversion mode from two conversion modes M1 and M2. Therefore, it is preferable to display, on a monitor of the image processing apparatus 7, the simulation images of prints reproduced through two conversion modes M1 and M2, and to make an operator to input from a key board for selecting an appropriate conversion mode so that conversion may be made through the conversion mode selected in accordance with the input from the key board.

Reproduction from a Color Reversal Film

Color reversal image information for blue, green and red obtained by reading apparatus 6 in the present embodiment is density image information wherein images recorded on color negative film 5 are expressed with density for blue, green and red. Image outputting apparatus 8 of the present embodiment is an apparatus wherein a color photographic paper representing a silver halide color photographic light-sensitive material for general photographing use having thereon a blue-sensitive yellow color forming layer, a green-sensitive magenta color forming layer, and a red-sensitive cyan color forming layer is exposed to light based on color output image information to output color print 9 reproducing subject 1. Incidentally, this color photographic paper is also a light-sensitive material having thereon plural light-sensitive layers each having a different color sensitivity for each primary color. Color output image information obtained by image processing apparatus 7 of the present embodiment is color exposure amount image information wherein an image is expressed with common logarithm E of an amount of exposure for blue, green and red to be given to the aforesaid color photographic paper.

Figure 3:
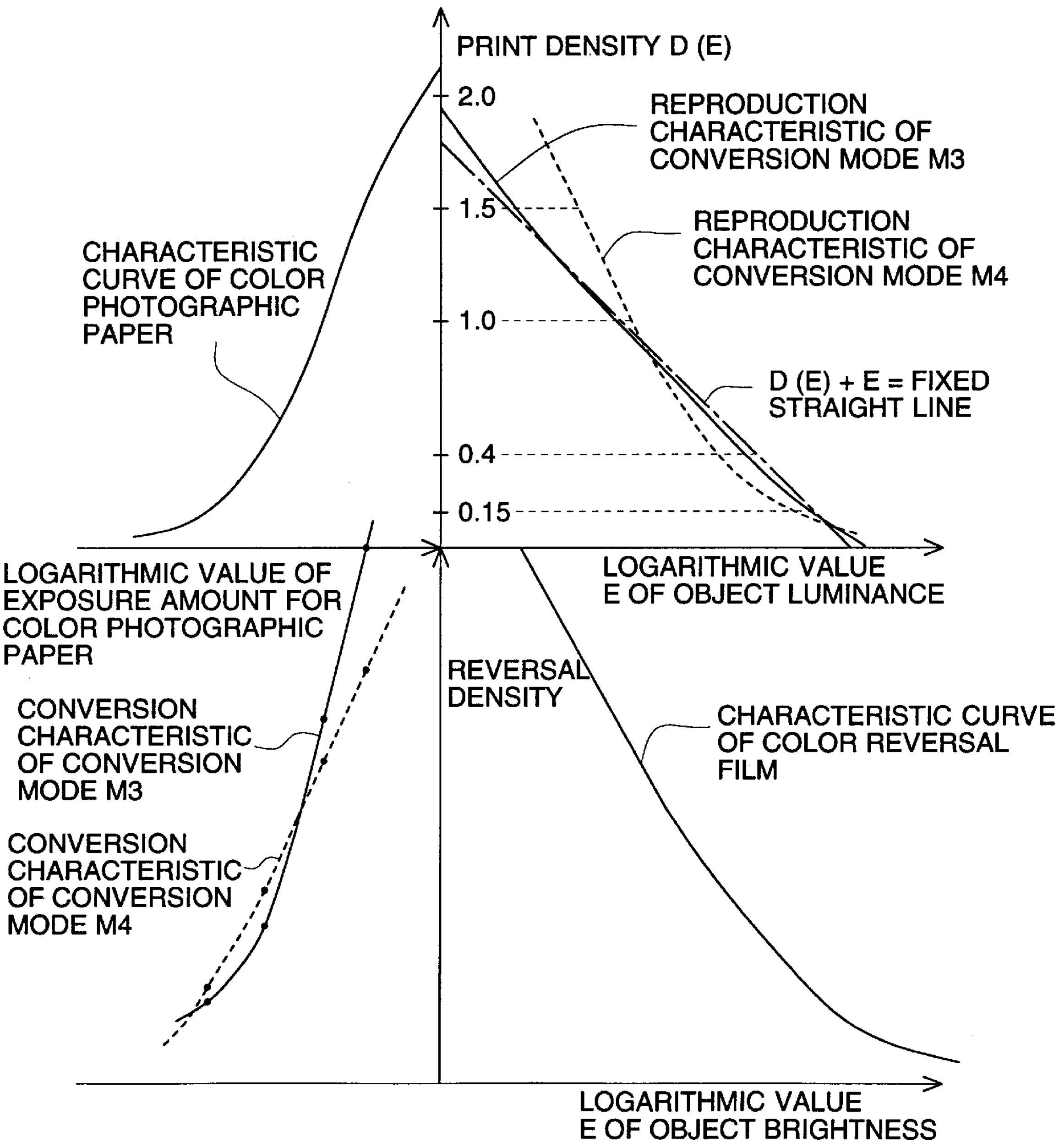
FIG. 3 is a diagram showing reproduction characteristics and characteristic curves of a color reversal film in Embodiment 1.

The image processing apparatus 7 of the present embodiment converts color reversal image information for blue, green and red obtained by reading apparatus 6 into color output image information through conversion having conversion characteristics shown with a solid line in the lower left quadrant in FIG. 3, in conversion mode M3. Due to this, subject 1 of common logarithm E of brightness is reproduced to be of density D(E) on color print 9, as shown with reproduction characteristic indicated with a solid line in the upper right quadrant in FIG. 3. Incidentally, in the lower right quadrant in FIG. 3, there is shown a characteristic curve of a color reversal photographic film, and in the upper left quadrant in FIG. 3, there is shown a characteristic curve of a color photographic paper. The axis of ordinates for the upper right quadrant and the upper left quadrant in FIG. 3 represents density D(E) on a color print, and the axis of ordinates for the lower right quadrant and the lower left quadrant in FIG. 3 represents density on the color reversal film, while the axis of abscissas for the upper right quadrant and the lower right quadrant in FIG. 3 represents common logarithm E of brightness of subject 1 and the axis of abscissas for the upper left quadrant and the lower left quadrant in FIG. 3 represents a common logarithm of an amount of exposure to be given to a color photographic paper.

Conversion of a uniform color space to the color specification which requires complicated operation, color compression processing in the color specification of the uniform color space and conversion of a uniform color space from the color specification are made to be unnecessary by the conversion mode M3. Due to this conversion M3, subject 1 of common logarithm E of brightness is reproduced to be of density D(E) on color print 9, as shown in the upper right quadrant in FIG. 3. Reproduction characteristics shown in the upper right quadrant in FIG. 3 appear. Due to the foregoing, this reproduction characteristic is made to be the same as that in conversion mode M1 for reproduction from a color negative film.

In the image processing apparatus 7, color reversal image information for blue, green and red obtained by reading apparatus 6 is converted into color output image information for blue, green and red under the conversion mode M4 having conversion characteristics and reproduction characteristics both shown with broken lines in FIG. 3. Due to the foregoing, this reproduction characteristic is made to be the same as that in conversion mode M2 for reproduction from a color negative film.

As stated above, in the image processing apparatus 7, even in the case of reproduction from a color negative film, an excellent color print corresponding to each scene can be obtained by selecting an appropriated conversion mode from two conversion modes α and β. Therefore, it is preferable to display each scene on a monitor of the image processing apparatus 7, and to make an operator to input from a key board for selecting an appropriate conversion mode so that conversion mode may be made through the conversion mode selected in accordance with the input from the key board.

Reproduction from a Digital Camera

Color photographed image information for blue, green and red obtained by recording medium reading apparatus 16 of the present embodiment is color camera output value image information wherein an image of subject 1 is expressed by an output value of a digital camera. Image outputting apparatus 8 of the present embodiment is an apparatus wherein a color photographic paper representing a silver halide color photographic light-sensitive material for general photographing use having thereon a blue-sensitive yellow color forming layer, a green-sensitive magenta color forming layer and a red-sensitive cyan color forming layer is exposed to light based on color output image information to output color print 9 reproducing subject 1. Incidentally, this color photographic paper is also a light-sensitive material having thereon plural light-sensitive layers each having a different color sensitivity for each primary color. Color output image information obtained by image processing apparatus 7 of the present embodiment is color exposure amount image information wherein an image is expressed with common logarithm E of an amount of exposure for blue, green and red to be given to the aforesaid color photographic paper.

Figure 4:
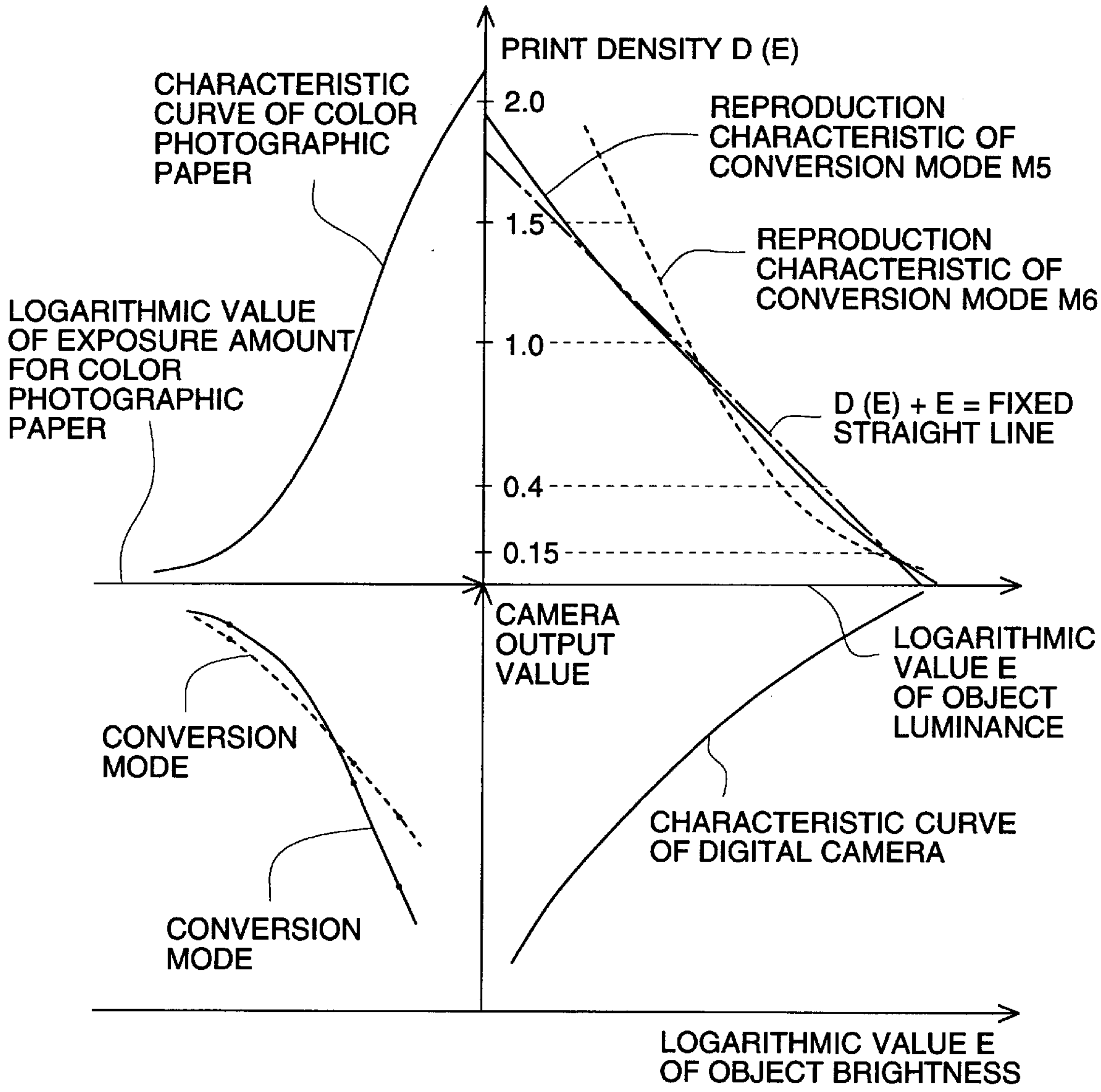
FIG. 4 is a diagram showing reproduction characteristics and characteristic curves of a digital camera in Embodiment 1.

Image processing apparatus 7 of the present embodiment converts color photographed image information for blue, green and red obtained by reading apparatus 6 into color output image information through "conversion from camera output value into an amount of exposure to be given to a color photographic paper" having conversion characteristics shown with a solid line in the lower left quadrant in FIG. 4 in conversion mode M5. Due to this, subject 1 of common logarithm E of brightness is reproduced to be of density D(E) on color print 9, as shown with reproduction characteristic indicated with a solid line in the upper right quadrant in FIG. 4. Incidentally, in the lower right quadrant in FIG. 4, there is shown a characteristic curve showing the relation between a common logarithm of brightness of subject 1 for digital camera 12 and an output value of the camera, and in the upper left quadrant in FIG. 4, there is shown a characteristic curve of a color photographic paper. The axis of ordinates for the upper right quadrant and the upper left quadrant in FIG. 4 represents density D(E) on a color print, and the axis of ordinates for the lower right quadrant and the lower left quadrant in FIG. 4 represents camera output values of digital camera 12, while the axis of abscissas for the upper right quadrant and the lower right quadrant in FIG. 4 represents common logarithm E of brightness of subject 1 and the axis of abscissas for the upper left quadrant and the lower left quadrant in FIG. 4 represents a common logarithm of an amount of exposure to be given to a color photographic paper.

Conversion of a uniform color space to the color specification which requires complicated operation, color compression processing in the color specification of the uniform color space and conversion of a uniform color space from the color specification are made to be unnecessary by the conversion mode M5. Due to this conversion α, subject 1 of common logarithm E of brightness is reproduced to be of density D(E) on color print 9, as shown in the upper right quadrant in FIG. 5. Reproduction characteristics shown in the upper right quadrant in FIG. 5 appear. Incidentally, this reproduction characteristic is made to be the same as that in conversion mode M1 for reproduction from a color negative film.

Figure 5:
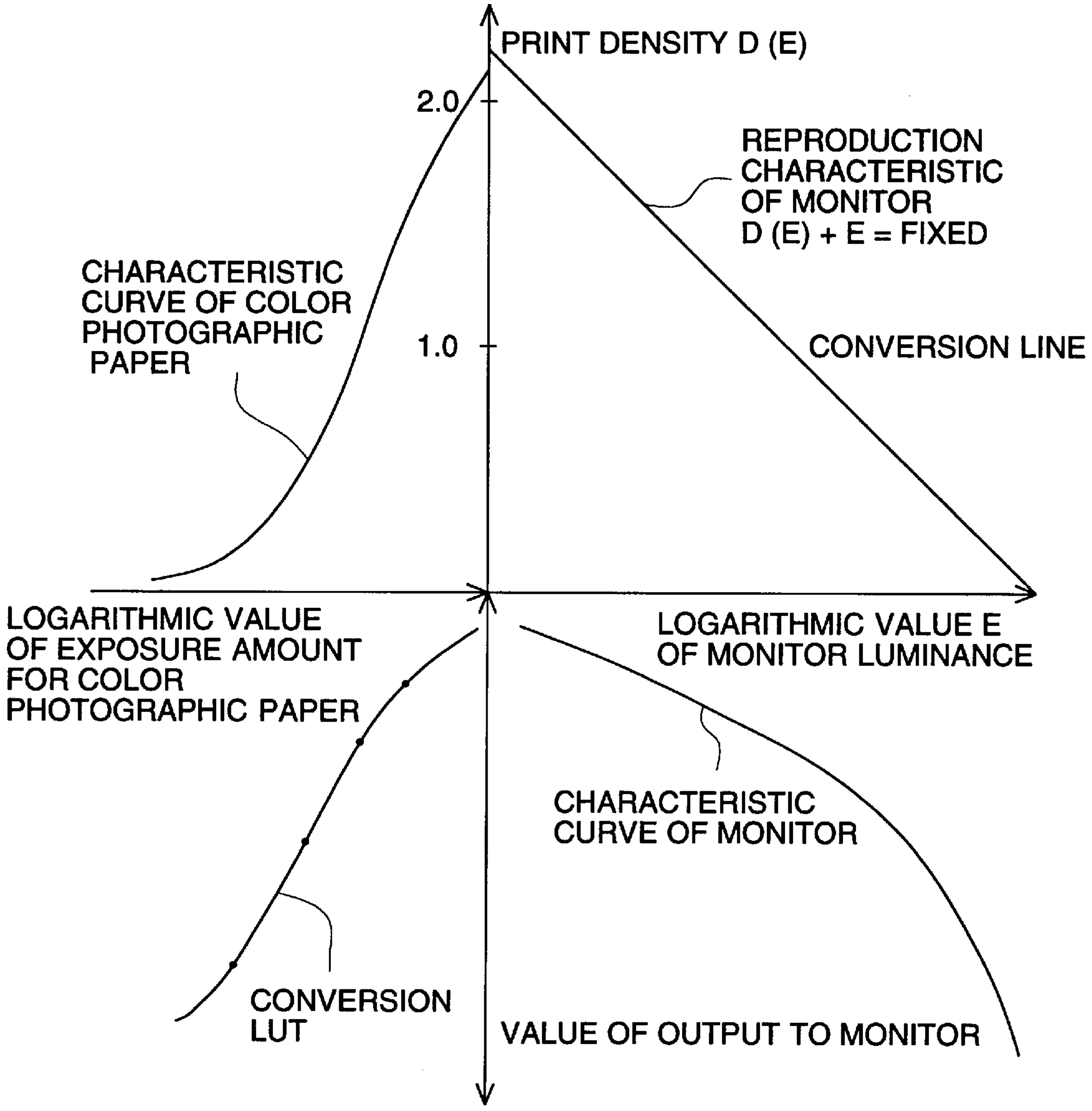
FIG. 5 is a diagram showing reproduction characteristics and characteristic curves of a monitor in Embodiment 1.

In the image processing apparatus 7, color photographed image information for blue, green and red obtained by reading apparatus 6 is converted into color output image information for blue, green and red under the conversion mode M6 having conversion characteristics shown with broken lines in the lower left quadrant in FIG. 5. Due to the foregoing, this reproduction characteristic is made to be the same as that in conversion mode M1 for reproduction from a color negative film.

As stated above, in the image processing apparatus 7, even in the case of reproduction from a digital camera, an excellent color print corresponding to each scene can be obtained by selecting an appropriate conversion mode from two conversion modes M5 and M6. Therefore, it is preferable to display each scene on a monitor of the image processing apparatus 7, and to make an operator to input from a key board for selecting an appropriate conversion mode so that conversion mode may be made through the conversion mode selected in accordance with the input from the key board.

Monitor Display

The image processing apparatus 7 of the present embodiment converts, for displaying a simulation image for a print reproducing with two conversion modes on a monitor of the image processing apparatus 7, the color output image information for blue, green and red into color monitor output image information through the conversion shown in the lower left quadrant in FIG. 2. Incidentally, the color output image information is color exposure amount image information wherein an image is expressed with a common logarithm of an exposure amount for blue, green and red to be given to the color photographic paper stated above, while the color monitor output image information is color image information expressed with output values for blue, green and red to be outputted to the monitor.

Due to this, reproduction is made as shown in the upper right quadrant in FIG. 2 in a way that the sum of a common logarithm value of brightness on the monitor and density D(E) on color print 9 is constant, namely, in a way for the ideal reproduction. Incidentally, a characteristic curve of the monitor (a curve showing the relation between an output value outputted to the monitor and a common logarithm value of brightness on the monitor) is shown in the lower right quadrant in FIG. 2, and a characteristic curve of a color photographic paper is shown in the upper left quadrant in FIG. 2. The axis of ordinates for the upper right quadrant and the upper left quadrant in FIG. 2 represents density D(E) on a color print, and the axis of ordinates for the lower right quadrant and the lower left quadrant in FIG. 2 represents an output to the monitor, while the axis of abscissas for the upper right quadrant and the lower right quadrant in FIG. 2 represents common logarithm E of brightness of the monitor and the axis of abscissas for the upper left quadrant and the lower left quadrant in FIG. 2 represents a common logarithm of an amount of exposure to be given to a color photographic paper.

Conversion of a uniform color space to the color specification which requires complicated operation, color compression processing in the color specification of the uniform color space and conversion of a uniform color space from the color specification are made to be unnecessary by the conversion stated above. Due to this conversion, as shown in the upper right quadrant in FIG. 2, the sum of a common logarithm value of brightness on the monitor and density D(E) on color print 9 is made to be constant. Namely, the gradation of an image on color print 9 comes to be capable of being reproduced on the monitor. Therefore, despite the color print obtained through conversion by means of any conversion mode among plural conversion modes, it is possible to display a simulation image that simulates an image of color print 9 satisfactorily on a monitor, which makes it possible to judge whether color output image information is satisfactory or not and thereby to select easily either one among plural conversion modes.

Embodiment 2

The image reproduction system of the present embodiment is a variation of the image reproduction system of Embodiment 1. As is apparent from a characteristic curve of a silver halide color negative film for general photographing use shown in the lower right quadrant in FIG. 2, in the present embodiment, color negative film density image information, color reversal film density image information and photographed image information are converted into color output image information for a silver halide color negative film for general photographing use, by utilizing that common logarithm E of brightness of a subject and negative film density on a color negative film are in the proportional relation except an area where negative film density is considerably low and by making the reproduction characteristic having negative film density serving as a standard to be a prescribed one, and thereby a color print reproducing subject 1 properly is outputted. All of the points different from those in Embodiment 1 will be explained as follows.

Apparatus Structure

Figure 6:
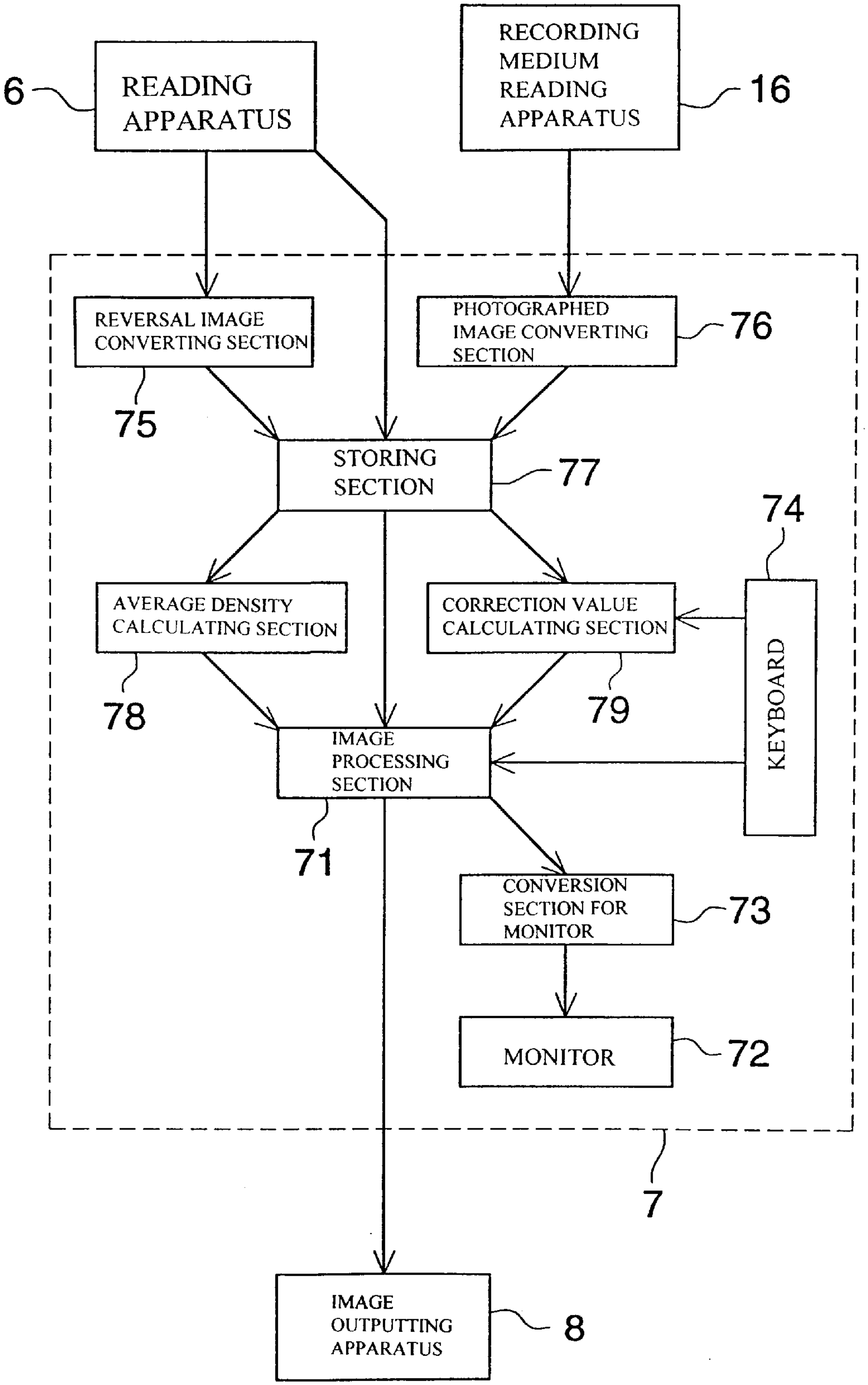
FIG. 6 is a schematic structure diagram of an image processing apparatus of an image reproducing system in Embodiment 2.

As shown in FIG. 6, the image processing apparatus 7 is provided with image processing section 71 which converts color negative film density image information for blue, green and red obtained by reading apparatus 6 into color output image information for blue, green and red to be outputted to image outputting apparatus 8, monitor 72, converting section for monitor 73 which conducts conversion for monitor 72 shown in the paragraph of "monitor display" in Embodiment 1 and key board 74, and further with reversal image converting section 75 which converts color reversal film density information for blue, green and red obtained by reading a color reversal film with reading apparatus 6 into negative film density equivalent image information which corresponds to negative film density image information, photographed image converting section 76 which converts color photographed image information obtained by recording medium reading apparatus 16 into color negative film density equivalent image information corresponding to color negative film density image information, storing section 77 which stores obtained color negative film density equivalent image information for blue, green and red or inputted negative film density image information for blue, green and red, average density calculating section 78 which obtains average negative film density information from the obtained color negative film density equivalent image information for blue, green and red or from color negative film density information for blue, green and red, and correction value calculating section 79 which obtains a correction value automatically from the obtained color negative film density equivalent image information for blue, green and red or from the obtained color negative film density image information for blue, green and red, through prescribed calculation, and adds an inputted manual correction value to the correction value obtained automatically when the manual correction value is inputted from the key board 74. The key board 74 also functions as an inputting section for inputting a manual correction value.

Reproduction from a Color Negative Film

In the image processing apparatus 7 of the present embodiment, color negative film density image information obtained by reading apparatus 6 is stored in storing section 77. The average density calculating section 78 reads color negative film density image information for blue, green and red out of the storing section 77, then obtains average negative film density of the image, and sends the obtained average color negative film density of the image to image processing section 71. The correction value calculating section 79 reads color negative film density image information for blue, green and red out of the storing section 77, then automatically obtains a correction value for the image through prescribed calculation, and adds an manual correction value inputted to the correction value for the image obtained automatically when the manual correction value is inputted from the key board 74, and sends the obtained correction value for the image to image processing section 71. Then, the image processing section 71 adds the correction value for the image thus sent and an average color negative density for the image under conversion mode M11, and calculates reference color negative film density NS.

Incidentally, an object of a prescribed calculation for the correction value calculating section 79 to obtain a correction value for the image from color negative film density image information for blue, green and red is to correct a reproduction failure (subjective failure) for a primary subject which is mainly caused in a scene under strobe emission, a rear-light scene, and a scene having a big difference of brightness in an image plane when output image information is obtained through image processing based on the average negative film density information and a print is made from the obtained output image information. As an example of prescribed calculation wherein the correction value calculating section 79 obtains a correction value for the image from color negative film density image information for blue, green and red, there is given a method wherein an amount of plural image characteristics is calculated from color negative density image information for blue, green and red, and a correction value is obtained by using the sum of product expression for the plural image characteristics.

The image processing section 71 converts color negative film density image information into color output image information so that the reference color negative film density may be reproduced on a print to be higher than minimum density Dmin by 0.8. Incidentally, the color output image information is digital image information wherein an image is expressed with an amount of exposure to be given to a color photographic paper.

Figure 7:
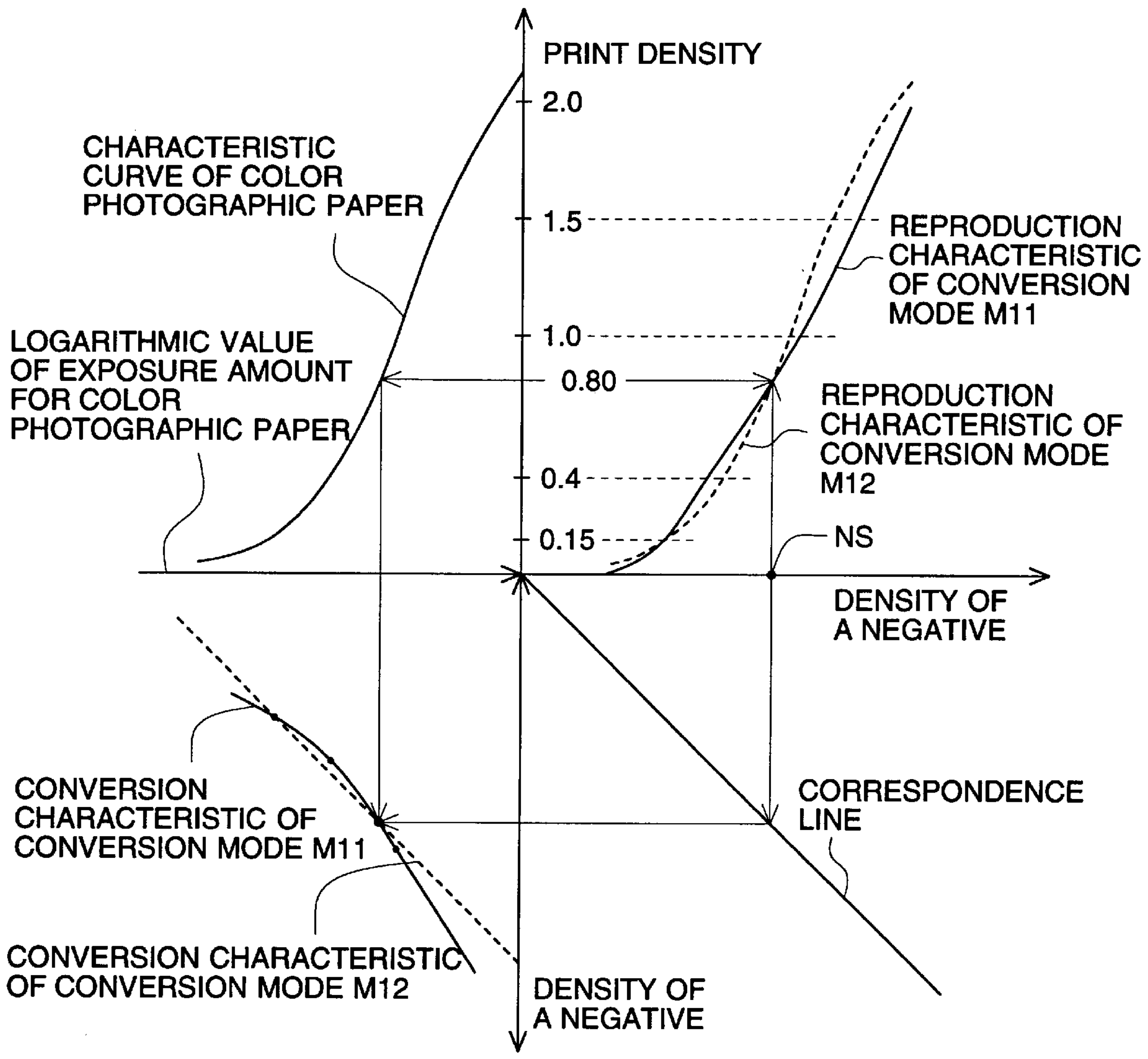
FIG. 7 is a diagram showing reproduction characteristics and characteristic curves of a color negative film in Embodiment 2.

FIG. 7 shows the conversion from color negative film density image information into color output image information conducted in the image processing section 71 as stated above. In the conversion mode M11, color negative film density image information is converted into color output image information through conversion having conversion characteristics as those shown with a solid line in the lower left quadrant in FIG. 7. Due to this, subject 1 having negative film density N is reproduced on color print 9 to be of density D(N) as indicated with reproduction characteristics shown with a solid line in the upper right quadrant in FIG. 7. In the conversion mode M12, color negative film density image information is converted into color output image information through conversion having conversion characteristics as those shown with a broken in the lower left quadrant in FIG. 7. Due to this, subject 1 having negative film density N is reproduced to of density D(N) on color print 9, as is indicated by reproduction characteristic shown with a broken line in the upper right quadrant in FIG. 7. Incidentally, both axis of ordinates and axis of abscissas in the lower right quadrant in FIG. 7 represent a correspondence line showing negative film density, and in the upper left quadrant in FIG. 7, there is shown a characteristic curve of a color photographic paper. The axis of ordinates for the upper right quadrant and the upper left quadrant in FIG. 7 represents negative film density N on the color negative film obtained by processing a silver halide color negative film for general photographing use in a way that the downward direction represents the positive direction, while the axis of abscissas for the upper right quadrant and the lower right quadrant in FIG. 7 represents negative film density N and the axis of abscissas for the upper left quadrant and the lower left quadrant in FIG. 2 represents a common logarithm of an amount of exposure to be given to a color photographic paper.

Conversion of a uniform color space to the color specification which requires complicated operation, color compression processing in the color specification of the uniform color space and conversion of a uniform color space from the color specification are made to be unnecessary by the conversion modes M11 and M12. By means of these conversion modes M11 and M12, conversion characteristics are deviated vertically in the lower left quadrant to be used, so that reproduction characteristics wherein reference color negative film density NS is reproduced to be density Dmin+0.8 on color print 9 may be obtained as shown in the upper right quadrant in FIG. 7.

The reproduction characteristics of the conversion mode M11 will be explained as follows. In the reproduction characteristics, Expression (12) holds for arbitrary negative film density N satisfying following Expression (11) with regard to primary colors of blue, green and red.

$$D(N1) \leqq D(N) \leqq D(N2) \qquad \text{Expression (11)}$$

$$1.2 \leqq ((D(N+0.1)-D(N)))/0.1 \leqq 1.8 \qquad \text{Expression (12)}$$

In the expression, D(N) represents density with which a subject having negative film density N is reproduced on a color print, and Dmin represents minimum density which can be reproduced on a color print, while the following expressions hold.

$$D(N1)=Dmin+0.15$$

$$D(N2)=Dmin+0.4$$

Due to this, even when an object with a bright color is reproduced to be a highlight, it is possible to obtain excellent gradation feeling and sufficient three-dimensional feeling. It is also possible to prevent low chroma of color reproduction on the part of low density represented by a phenomenon wherein, even when a primary object such as a person is photographed with frontal lighting under a blue sky, the sky is reproduced to be light gray on a color print, making the color print look as if it was photographed under a clouded sky, thus, it is possible to obtain a color print on which color reproduction on the part of low luminance is excellent.

In the reproduction characteristics, Expression (14) holds for arbitrary negative film density N satisfying following Expression (13) with regard to primary colors of blue, green and red.

$$D(N2) \leqq D(N) \leqq D(N3) \qquad \text{Expression (13)}$$

$$1.0 \times A3((D(N+0.1)-D(N)))/0.1 \leqq 1.2 \times A3 \qquad \text{Expression (14)}$$

With regard to the expression, the following expressions hold.

$$A3=|(D(N2)-D(N1))/(N2-N1)|$$

$$D(N3)=Dmin+1.0$$

Due to the foregoing, the gradient of gradation reproduced on the density area where the density is higher by 0.4–0.8 than minimum density reproducible on a color print represents an ideal reproduction to be 1.0×A3–1.2×A3, and thereby it is possible to secure a broad area for gradation reproduction while keeping excellent gradation feeling and sufficient three-dimensional feeling, and it is possible to prevent occurrence of unnatural color reproduction for specific colors in a medium density area such as that a color of a face with a bright flesh color is reproduced to be more yellowish than its actual color, and thereby to obtain an excellent color print on which natural colors are reproduced in the medium density area.

Further, in the reproduction characteristics, the following Expressions (16–17) hold for arbitrary negative film density N satisfying the following Expression (15).

$$D(N3) \leqq D(N) \leqq D(N4) \qquad \text{Expression (15)}$$

$$1.1 \times A4(D(N+0.1)-D(N)))/0.1 \leqq 2.0 \times A4 \qquad \text{Expressions (16–17)}$$

In the expression, the following expressions hold.

$$A4=|(D(N3)-D(N2))/(N3-N2)|$$

$$D(N3)=Dmin+1.0$$

$$D(N4)=Dmin+1.5$$

Due to this, dark colors on a print are made to be tight satisfactorily because a high density area is reproduced to be higher in terms of contrast than a medium density area, and tightness and minimum density of an image are visually improved. Further, though colors and signals of an image pickup medium for each primary color have color crossover, and color dyes forming a color print are not pure primary colors generally, a subject with high chroma (luminance of one or two primary colors among primary colors of blue, green and red is considerably low, namely reproduced to be a high density area on a color print) can be reproduced to be of an excellent color on a color print.

The image processing apparatus 7 of the present embodiment converts color negative film density image information for blue, green and red obtained by reading apparatus 6 into color output image information for blue, green and red, through conversion wherein the color negative film density image information is just subtracted from the prescribed constant, in conversion mode M12 of conversion characteristics and reproduction characteristics shown with broken lines in FIG. 2. Due to this, it is possible to obtain a color print having reproduction characteristics shown with a broken line in the upper right quadrant in FIG. 2 which have been general in the conventional photographic industry. Due to the foregoing, it is possible to prevent that an object which is highly luminous compared with the primary object is reproduced to be white with no gradation on a color print when it is photographed together with the primary object, whereby a color print which keeps the gradation of an object which is highly luminous compared with the primary object can be obtained.

As stated above, in the image processing apparatus 7, even in the case of reproduction from a color negative film, an excellent color print corresponding to each scene can be obtained by selecting an appropriated conversion mode from two conversion modes M1 and M2. Therefore, it is preferable to display, on a monitor of the image processing apparatus 7, the simulation images of prints reproduced through two conversion modes M1 and M2, and to make an operator to input from a key board for selecting an appropriate conversion mode so that conversion may be made through the conversion mode selected in accordance with the input from the key board.

Reproduction from a Color Reversal Film

The image processing apparatus 7 of the present embodiment first sends color reversal film density image information for blue, green and red obtained by reading apparatus 6 to reversal image conversion section 75. The reversal image conversion section 75 converts the color reversal film density image information for blue, green and red into negative film density equivalent image information corresponding to negative film density image information, and stores them in storing section 77. Image processing section 71 converts color negative film density equivalent image information into color output image information so that an image having reference reversal film density NS shown by the reference reversal film density information determined in advance, or an image having reversal film density wherein an inputted manual correction value is added to the reference reversal film density NS when there is an input of the manual correction value from the key board 74, may be reproduced to be of density that is higher than minimum density by 0.8 on a print. Incidentally, color output image information is digital image information wherein an image is expressed by an amount of exposure to be given to a color photographic paper.

Operations conducted after the image processing section 71 has converted to color output image information are the same as those explained in the section of "Reproduction from a color negative film".

Incidentally, reversal image converting section 75 converts color reversal film density image information for blue, green and red into negative film density equivalent image information based on reversal conversion information representing the information for converting from reversal film density information into negative film density equivalent information. How to prepare the reversal conversion information will be stated afterwards.

Reproduction from a Digital Camera

The image processing apparatus 7 of the present embodiment first sends color photographed image information for blue, green and red obtained by recording medium reading apparatus 16 to photographed image converting section 76. The photographed image converting section 76 converts the photographed image information for blue, green and red into negative film density equivalent image information corresponding to negative film density image information, and stores them in storing section 77. Image processing section 71 converts color negative film density equivalent image information into color output image information so that an image having reference value SS determined in advance by photographed image information, or an image having a value wherein an inputted manual correction value is added to the reference value SS when there is an input of the manual correction value from the key board 74, may be reproduced to be of density that is higher than minimum density by 0.8 on a print. Incidentally, color output image information is digital image information wherein an image is expressed by an amount of exposure to be given to a color photographic paper.

Operations conducted after the image processing section 71 has converted to color output image information are the same as those explained in the section of "Reproduction from a color negative film".

Incidentally, photographed image converting section 76 converts photographed image information for blue, green and red into negative film density equivalent image information based on photographed image conversion information representing the information for converting from photographed image information into negative film density equivalent information for each of blue, green and red. Incidentally, how to prepare the photographed image conversion information will be stated afterwards.

Figure 8:
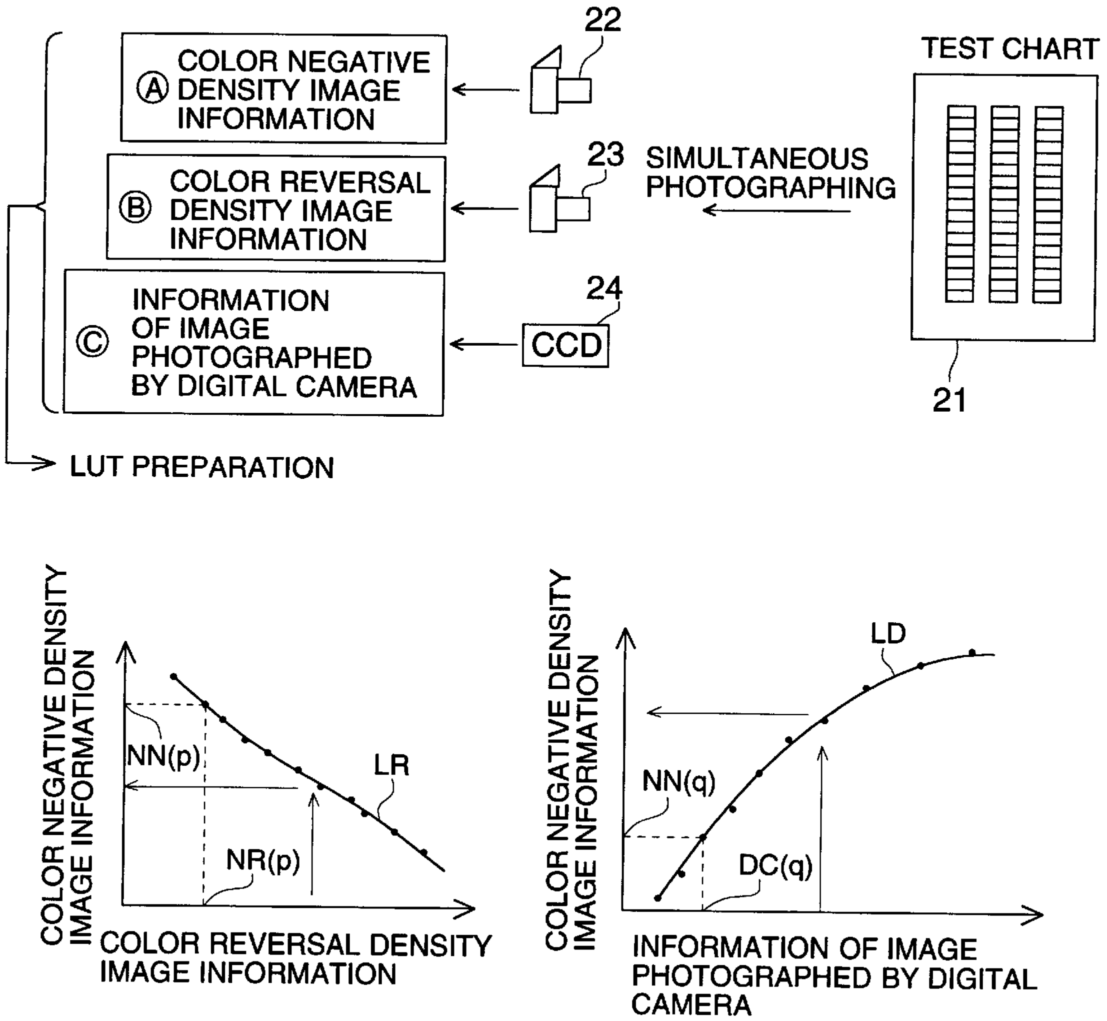
FIG. 8 is a diagram showing a method of preparing reversal film conversion information and photographed image conversion information in Embodiment 2.

How to Prepare Reversal Conversion Information and Photographed Image Conversion Information How to prepare reversal conversion information and photographed image conversion information will be explained with reference to FIG. 8. Test chart 21 on which gray color chips p (which are illuminated under the uniform illumination condition and have respectively density steps in plural number P (p represents a natural number ranging from 1 to P) is photographed respectively by camera 22 loaded with a silver halide color negative film for general photographing use, camera 22 loaded with a silver halide color reversal film for general photographing use, and digital camera 23, under the appropriate exposure. Then, the silver halide color negative film for general photographing use thus exposed and the silver halide color reversal film for general photographing use thus exposed are processed by appropriate film processors corresponding respectively to the films under the standard processing conditions, whereby, color negative film density image information and color reversal film density image information are obtained by measuring density of an image of each color chip p on the color negative film and the color reversal film thus obtained. From the digital camera 23, photographed image information of an image of each color chip p is obtained.

Then, for each color chip p, a dot corresponding to color negative film density image information NN (p) corresponding to each color chip and that corresponding to color reversal film density image information NR (p) are marked. Then, smoothed conversion curve LR is drawn from the marked graph, and from this conversion curve LR, there is obtained reversal conversion information representing the information for converting from reversal density information into negative film density equivalent information.

Further, for each color chip p, a dot corresponding to color negative film density image information NN (p) corresponding to each color chip and that corresponding to color photographed image information DC (p) are marked. Then, smoothed conversion curve LD is drawn from the marked graph, and from this conversion curve LD, there is obtained photographed image conversion information representing the information for converting from photographed image information into negative film density equivalent information.

The present invention makes it possible to obtain an excellent print which offers excellent gradation feeling and sufficient three-dimensional feeling, even when a bright subject is reproduced to be bright.

What is claimed is:

1. An image reproducing method, comprising:

obtaining a print reproducing an object based on image information obtained by photographing the object, wherein logarithm E of object brightness satisfies formula (1) and formula (2) is effected with the logarithm E, $$D(E1)\leqq D(E)\leqq D(E2) \quad (1)$$

$$0.7\leqq(D(E+0.1)-D(E))/0.1\leqq 1.3 \quad (2)$$

wherein D(E) represents density on the print reproduced by the logarithm E of object brightness, Dmin represents minimum density reproduced on the print, and D(E1) and D(E2) satisfy the following formulas $$D(E1)=Dmin+0.15$$

$$D(E2)=Dmin+0.4.$$

2. The image reproducing method of claim 1, wherein the logarithm E satisfies formula (3) and formula (4) is effected with the logarithm E, $$D(E2)\leqq D(E)\leqq D(E3) \quad (3)$$

$$1.0\times A1\leqq(D(E+0.1)-D(E))/0.1\leqq 1.2\times A1 \quad (4)$$

wherein A1 and D(E3) satisfy the following formulas $$A1=|(D(E2)-D(E1))/(E2-E1)|$$

$$D(E3)=Dmin+1.0.$$

3. The image reproducing method of claim 1, wherein the logarithm E satisfies formula (5) and formula (6) is effected with the logarithm E, $$D(E3)\leqq D(E)\leqq D(E4) \quad (5)$$

$$1.0\times A2(D(E+0.1)-D(E))/0.1\leqq 2.0\times A2 \quad (6)$$

wherein A2, D(E3) and D(E4) satisfy the following formulas $$A2=|(D(E3)-D(E2))/(E3-E2)|$$

$$D(E3)=Dmin+1.0$$

$$D(E4)=Dmin+1.5.$$

4. An image reproducing system, comprising:

reading means for reading a photographed image of an object on an image recording medium so as to obtain read-image information;

image processing means for converting the read-image information into output-image information, and image outputting means for outputting a print reproducing the object on the basis of the output-image information, wherein the image processing means has a converting mode α to convert the read-image information into the output-image information in such a manner that logarithm E of object brightness satisfies formula (1) and formula (2) is effected with the logarithm E, $$D(E1)\leqq D(E)\leqq D(E2) \quad (1)$$

$$0.7\leqq(D(E+0.1)-D(E))/0.1\leqq 1.3 \quad (2)$$

wherein D(E) represents density on the print reproduced by the logarithm E of object brightness, Dmin represents minimum density reproduced on the print, and D(E1) and D(E2) satisfy the following formulas $$D(E1)=Dmin+0.15$$

$$D(E2)=Dmin+0.4.$$

5. The image reproducing system of claim 4, wherein the converting mode α includes a converting mode β to convert the read-image information into the output-image information in such a manner that the logarithm E satisfies formula (3) and formula (4) is effected with the logarithm E, $$D(E2)\leqq D(E)\leqq D(E3) \quad (3)$$

$$1.0\times A1\leqq(D(E+0.1)-D(E))/0.1\leqq 1.2\times A1 \quad (4)$$

wherein A1 and D(E3) satisfy the following formulas $$A1=|(D(E2)-D(E1))/(E2-E1)|$$

$$D(E3)=Dmin+1.0.$$

6. The image reproducing system of claim 5, wherein the converting mode β includes a converting mode γ to convert the read-image information into the output-image information in such a manner that the logarithm E satisfies formula (5) and formula (6) is effected with the logarithm E, $$D(E3)\leqq D(E)\leqq D(E4) \quad (5)$$

$$1.0\times A2(D(E+0.1)-D(E))/0.1\leqq 2.0\times A \quad (6)$$

wherein A2, D(E3) and D(E4) satisfy the following formulas $$A2=|(D(E3)-D(E2))/(E3-E2)|$$

$$D(E3)=Dmin+1.0$$

$$D(E4)=Dmin+1.5.$$

7. The image reproducing system of claim 4, wherein in addition to the converting mode α, the image processing means has a converting mode ε to convert the read-image information into the output-image information in such a manner that a part of logarithm E of object brightness satisfies formula (1) and formula (8) or formula (9) is effected with the logarithm E and that logarithm E of object brightness satisfies formula (3) and formula (10) is effected with the logarithm E, $$D(E1) \leqq D(E) \leqq D(E2) \quad (1)$$

$$((D(E+0.1)-D(E)))/0.1 \leqq 0.7 \quad (8)$$

$$1.3 \leqq ((D(E+0.1)-D(E)))/0.1 \quad (9)$$

$$D(E2) \leqq D(E) \leqq D(E3) \quad (3)$$

$$1.2 \times A1 < ((D(E+0.1)-D(E)))/0.1 \quad (10)$$

wherein A1 and D(E3) satisfy the following formulas $$A1 = |(D(E2)-D(E1))/(E2-E1)|$$

$$D(E3) = Dmin+1.0.$$

8. An image processing apparatus, comprising:

an image processing device to convert read-image information obtained by reading a photographed image of an object into output-image information based on which a print reproducing the object is outputted, wherein the image processing device has a converting mode $\alpha$ to convert the read-image information into the output-image information in such a manner that logarithm E of object brightness satisfies formula (1) and formula (2) is effected with the logarithm E, $$D(E1) \leqq D(E) \leqq D(E2) \quad (1)$$

$$0.7 \leqq (D(E+0.1)-D(E))/0.1 \leqq 1.3 \quad (2)$$

wherein D(E) represents density on the print reproduced by the logarithm E of object brightness, Dmin represents minimum density reproduced on the print, and D(E1) and D(E2) satisfy the following formulas $$D(E1) = Dmin+0.15$$

$$D(E2) = Dmin+0.4.$$

9. The image reproducing apparatus of claim 8, wherein the converting mode $\alpha$ includes a converting mode $\beta$ to convert the read-image information into the output-image information in such a manner that the logarithm E satisfies formula (3) and formula (4) is effected with the logarithm E, $$D(E2) \leqq D(E) \leqq D(E3) \quad (3)$$

$$1.0 \times A1 \leqq (D(E+0.1)-D(E))/0.1 \leqq 1.2 \times A1 \quad (4)$$

wherein A1 and D(E3) satisfy the following formulas $$A1 = |(D(E2)-D(E1))/(E2-E1)|$$

$$D(E3) = Dmin+1.0.$$

10. The image reproducing system of claim 9, wherein the converting mode $\beta$ includes a converting mode $\gamma$ to convert the read-image information into the output-image information in such a manner that the logarithm E satisfies formula (5) and formula (6) is effected with the logarithm E, $$D(E3) \leqq D(E) \leqq D(E4) \quad (5)$$

$$1.0 \times A2 \leqq (D(E+0.1)-D(E))/0.1 \leqq 2.0 \times A2 \quad (6)$$

wherein A2, D(E3) and D(E4) satisfy the following formulas $$A2 = |(D(E3)-D(E2))/(E3-E2)|$$

$$D(E3) = Dmin+1.0$$

$$D(E4) = Dmin+1.5.$$

11. The image reproducing apparatus of claim 8, wherein in addition to the converting mode $\alpha$, the image processing means has a converting mode $\epsilon$ to convert the read-image information into the output-image information in such a manner that a part of logarithm E of object brightness satisfies formula (1) and formula (8) or formula (9) is effected with the logarithm E and that logarithm E of object brightness satisfies formula (3) and formula (10) is effected with the logarithm E, $$D(E1) \leqq D(E) \leqq D(E2) \quad (1)$$

$$((D(E+0.1)-D(E)))/0.1 \leqq 0.7 \quad (8)$$

$$1.3 < ((D(E+0.1)-D(E)))/0.1 \quad (9)$$

$$D(E2) \leqq D(E) \leqq D(E3) \quad (3)$$

$$1.2 \times A1 < ((D(E+0.1)-D(E)))/0.1 \quad (10)$$

wherein A1 and D(E3) satisfy the following formulas $$A1 = |(D(E2)-D(E1))/(E2-E1)|$$

$$D(E3) = Dmin+1.0.$$

12. An image reproducing system, comprising:

reading means for obtaining negative density image information from negative film obtained by photographing an object on a silver halide color negative film or reversal film density image information from reversal film obtained by photographing an object on a silver halide color reversal film;

image processing means for converting the negative density image information into output-image information, and image outputting means for outputting a print reproducing the object on the basis of the output-image information, wherein the image processing means has a converting mode $\kappa$ to convert the negative density image information into the output-image information in such a manner that density N of color negative film satisfies formula (11) and formula (12) is effected with the density N, $$D(N1) \leqq D(N) \leqq D(N2) \quad (11)$$

$$1.2 \leqq ((D(N+0.1)-D(N)))/0.1 \leqq 1.8 \quad (12)$$

wherein D(N) represents density on a print reproduced with a color negative film having density N, Dmin represents minimum density reproducible on the print, and D(N1) and D(N2) satisfy the following formulas $$D(N1) = Dmin+0.15$$

$$D(N2) = Dmin+0.4.$$

13. The image reproducing system of claim 12, wherein the converting mode $\kappa$ includes a converting mode $\lambda$ to convert the negative density image information into the output-image information in such a manner that density N of color negative film satisfies formula (13) and formula (14) is effected with the density N, $$D(N2) \leqq D(N) \leqq D(N3) \quad (13)$$

$$1.0 \times A3 \leqq (D(N+0.1)-D(N))/0.1 \leqq 1.2 \times A3 \quad (14)$$

wherein A3 and D(N3) satisfy the following formulas $$A3=|(D(N2)-D(N1))/(N2-N1)|$$

$$D(N3)=Dmin+1.0.$$

14. The image reproducing system of claim 13, wherein the converting mode λ includes a converting mode μ to convert the negative density image information into the output-image information in such a manner that density N of color negative film satisfies formula (15) and formula (16) is effected with the density N, $$D(N3) \leqq D(N) \leqq D(N4) \quad (15)$$

$$1.1\times A4 \leqq (D(N+0.1)-D(N))/0.1 \leqq 2.0\times A4 \quad (16)$$

wherein A4, D(N3) and D(N4) satisfy the following formulas $$A4=|(D(N3)-D(N2))/(N3-N2)|$$

$$D(N3)=Dmin+1.0$$

$$D(N4)=Dmin+1.5.$$

15. The image reproducing system of claim 12, further comprising:

average density calculating means for obtaining average negative density information of the image from the negative density image information, wherein the image processing means converts the negative density image information into the output-image information in such a manner that an image having a density obtained by adding a correction value to average negative density represented by the average negative density information is reproduced on a print as an image having a density of (Dmin+0.6) to (Dmin+1.0).

16. The image reproducing system of claim 15, further comprising:

inputting means for inputting a manual correction value;

correction value calculating means for automatically obtaining a correction value by a predetermined calculation from the negative density image information, wherein when the manual correction value is inputted by the inputting means, the correction value calculating means adds the manual correction value with the correction value obtained automatically so as to obtain an added correction value, wherein the image processing means converts the negative density image information into the output-image information in such a manner that an image having a density obtained by adding the added correction value to average negative density represented by the average negative density information is reproduced on a print as an image having a density of (Dmin+0.6) to (Dmin+1.0).

17. The image reproducing system of claim 12, wherein the image processing means comprises converting means for converting the reversal film density image information into negative film-equivalent density image information corresponding to negative film density, and the image processing means converts the negative film-equivalent density image information into the output-image information.

18. The image reproducing system of claim 17, wherein the reversal film density image information is converted by the converting means into the read-image information corresponding to the negative film-equivalent density image information, based on conversion information obtained by correlating negative film density information of an image on a color negative film obtained by photographing an object under a condition on a silver halide color negative film with reversal film density information of an image on a color reversal film obtained by photographing the object under the condition on a silver halide color reversal film.

19. The image reproducing system of claim 15, further comprising:

inputting means for inputting a manual correction value; wherein the image processing means converts the negative film-equivalent density image information into the output-image information in such a manner that an image having a density DT indicated by predetermined standard reversal film density information or an image having a density obtained by adding manual correction value to the density DT when the manual correction value is inputted by the inputting means is reproduced on a print as an image having a density of (Dmin+0.6) to (Dmin+1.0), and the density DT satisfies the following formula $$0.8 \leqq DT \leqq 1.5.$$

20. The image reproducing system of claim 12, further comprising:

photographing image information obtaining means for obtaining photographing image information obtained by photographing an object by a digital camera; and converting means for converting the photographing image information into negative film-equivalent density image information corresponding to negative film density, wherein the image processing means converts the negative film-equivalent density image information into the output-image information.

21. The image reproducing system of claim 20, wherein the converting means converts the photographing image information into the negative film-equivalent density image information, based on conversion information obtained by correlating negative film density information of an image on a color negative film obtained by photographing an object under a condition on a silver halide color negative film with photographing image information obtained by photographing the object under the condition by the digital camera.

22. The image reproducing system of claim 20, further comprising:

inputting means for inputting a manual correction value;

wherein the image processing means converts the negative film-equivalent density image information into the output-image information in such a manner that an image having a predetermined standard value of the photographing image information or an image having a density obtained by adding manual correction value to the standard value when the manual correction value is inputted by the inputting means is reproduced on a print as an image having a density of (Dmin+0.6) to Dmin+1.0).

* * * * *